United States Patent [19]

Buma et al.

[11] Patent Number: 4,789,935
[45] Date of Patent: Dec. 6, 1988

[54] SUSPENSION CONTROLLER

[75] Inventors: Shuuichi Buma, Toyota; Toshio Onuma, Susono; Kaoru Ohashi, Okazaki; Masami Itou, Toyota, all of Japan

[73] Assignee: Toyota Jidosha Kabushiki Kaisha, Toyota, Japan

[21] Appl. No.: 930,554

[22] Filed: Nov. 14, 1986

[30] Foreign Application Priority Data

Nov. 25, 1985 [JP] Japan .................................. 60-265871

[51] Int. Cl.⁴ .............................................. B60G 17/00
[52] U.S. Cl. ................................ 364/424.05; 280/707
[58] Field of Search .................... 364/424, 425, 426; 180/169; 280/707, 6.11, 6 R, 6 H

[56] References Cited

U.S. PATENT DOCUMENTS

| 4,526,401 | 7/1985 | Kakizaka et al. | 280/707 |
| 4,610,462 | 9/1986 | Kamagui et al. | 280/707 |
| 4,634,143 | 1/1987 | Asami et al. | 280/707 |
| 4,639,014 | 1/1987 | Tanaka et al. | 280/707 |
| 4,648,622 | 3/1987 | Wada et al. | 280/707 |
| 4,669,749 | 6/1987 | Tanaka et al. | 280/707 |
| 4,685,689 | 8/1987 | Takizama et al. | 280/707 |
| 4,691,284 | 9/1987 | Izumi et al. | 364/424 |
| 4,693,494 | 9/1987 | Buma et al. | 280/707 |

FOREIGN PATENT DOCUMENTS

| 3407260 | 3/1983 | Fed. Rep. of Germany . |
| 56-31861 | 3/1981 | Japan . |
| 59-63218 | 4/1984 | Japan . |
| 59-186708 | 10/1984 | Japan . |
| 60-183216 | 9/1985 | Japan . |
| 60-193710 | 10/1985 | Japan . |
| 61-036009 | 2/1986 | Japan . |

Primary Examiner—Parshotam S. Lall
Assistant Examiner—Thomas G. Black
Attorney, Agent, or Firm—Oblon, Fisher, Spivak, McClelland & Maier

[57] ABSTRACT

Provided is a suspension controller which has a plurality of control sections in a control mechanism and which has the order of priority among the suspension controls when two or more different suspension controls are simultaneously instructed from the control sections, so as to optimally control the suspension characteristic according to both the road condition and the running condition of the vehicle. The suspension controller of the invention includes a preference mechanism or logic for preferentially altering the suspension characteristic to a harder state in order to reduce the vibration of the vehicle body and to prevent an abrupt change of the vehicle attitude, thus providing good control, high stability and riding comfort.

8 Claims, 33 Drawing Sheets

Fig. 11A

| | CONTROL START CONDITION | SUSPENSION CHARACT. | CONTROL END CONDITION | SUSPENSION CHARACT. |
|---|---|---|---|---|
| ANTI-ROLL CONTROL | 1. REGION X2 OR X3<br>2. REGION X4 & OVER 40Km/h | HARD | 1. 2[sec] PAST AFTER START CONDITION 1<br>2. 2[sec] PAST AFTER X3 TO X2,X1 OR X0<br>3. 2[sec] PAST AT UNDER 40Km/h | SPORT<br>SOFT |
| ANTI-SQUAT CONTROL | 1. REGION Y<br>2. REGION Z | HARD | 1. 2[sec] PAST AFTER START CONDITION 1 OR 2<br>2. OVER 30Km/h | SPORT<br>SOFT |
| ANTI-DIVE CONTROL | STOP LAMP SW. IS ON AT OVER 60Km/h | HARD | 2[sec] PAST AFTER STOP LAMP SW. IS OFF | SPORT<br>SOFT |
| ANTI-SHIFT SQUAT CONTROL | NEUTRAL START SW. IS ON AT UNDER 10Km/h | HARD | 1. OVER 15Km/h<br>2. 5[sec] PAST AFTER NEUTRAL START SW. IS OFF | SPORT<br>SOFT |

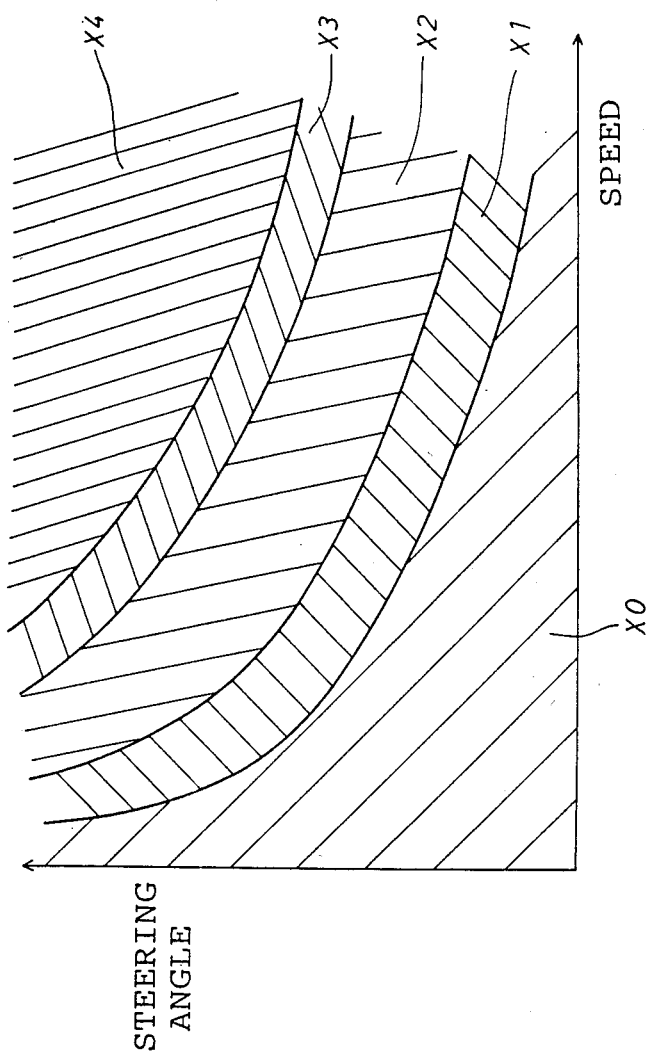

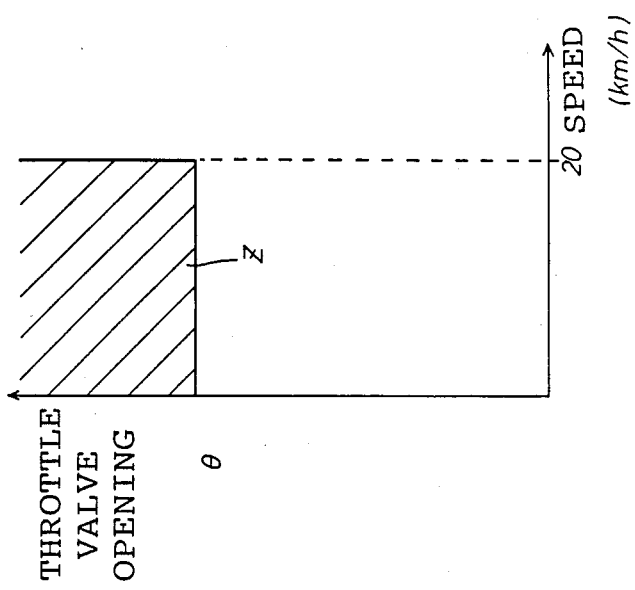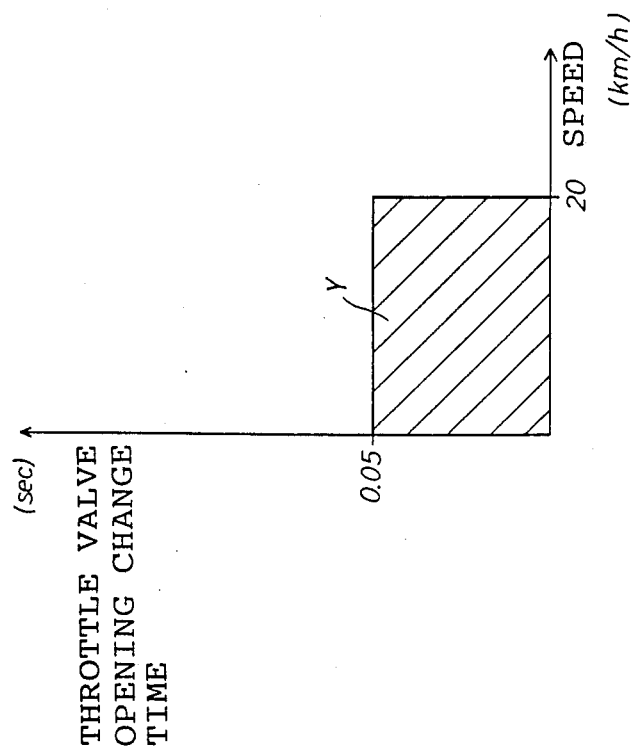

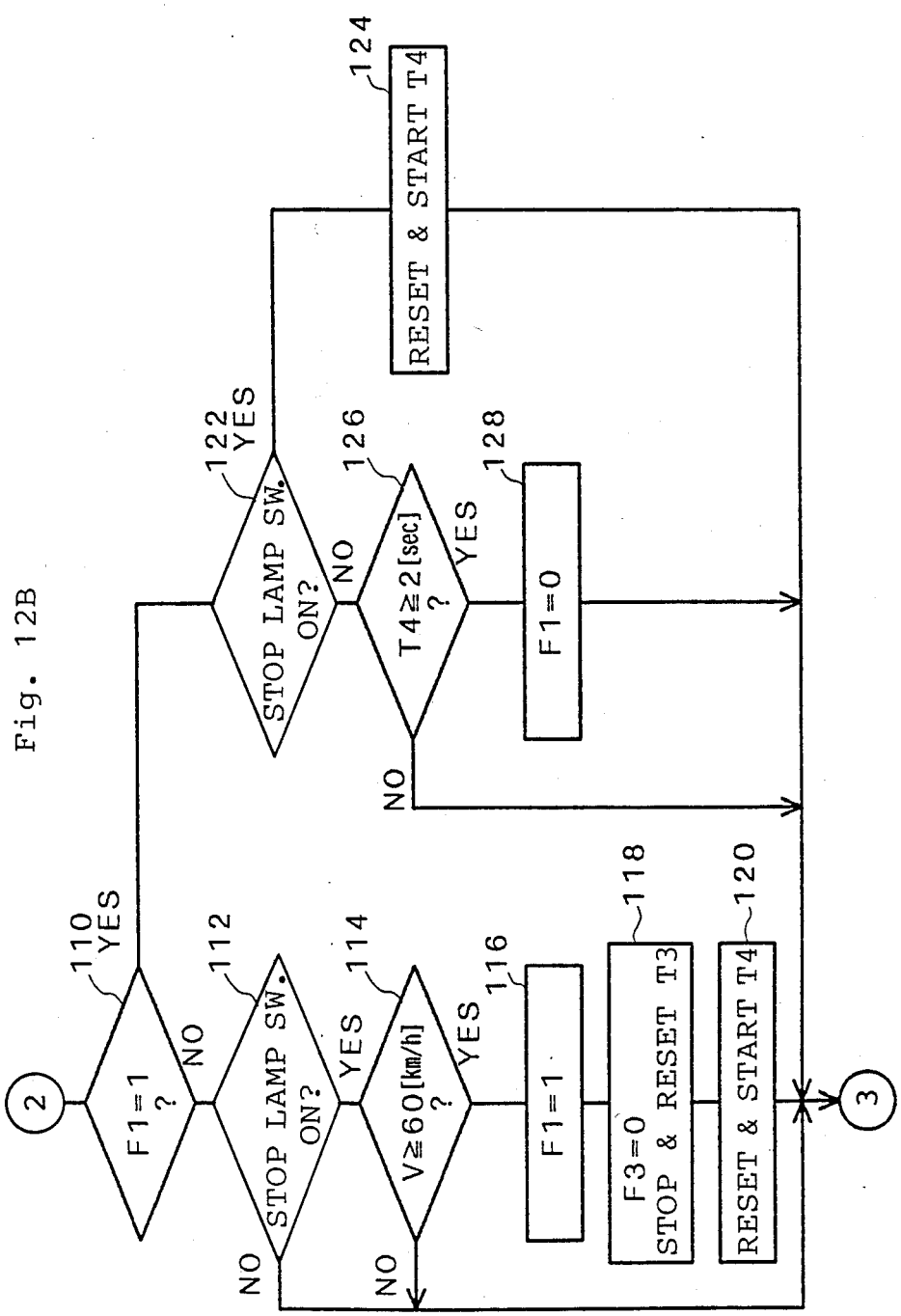

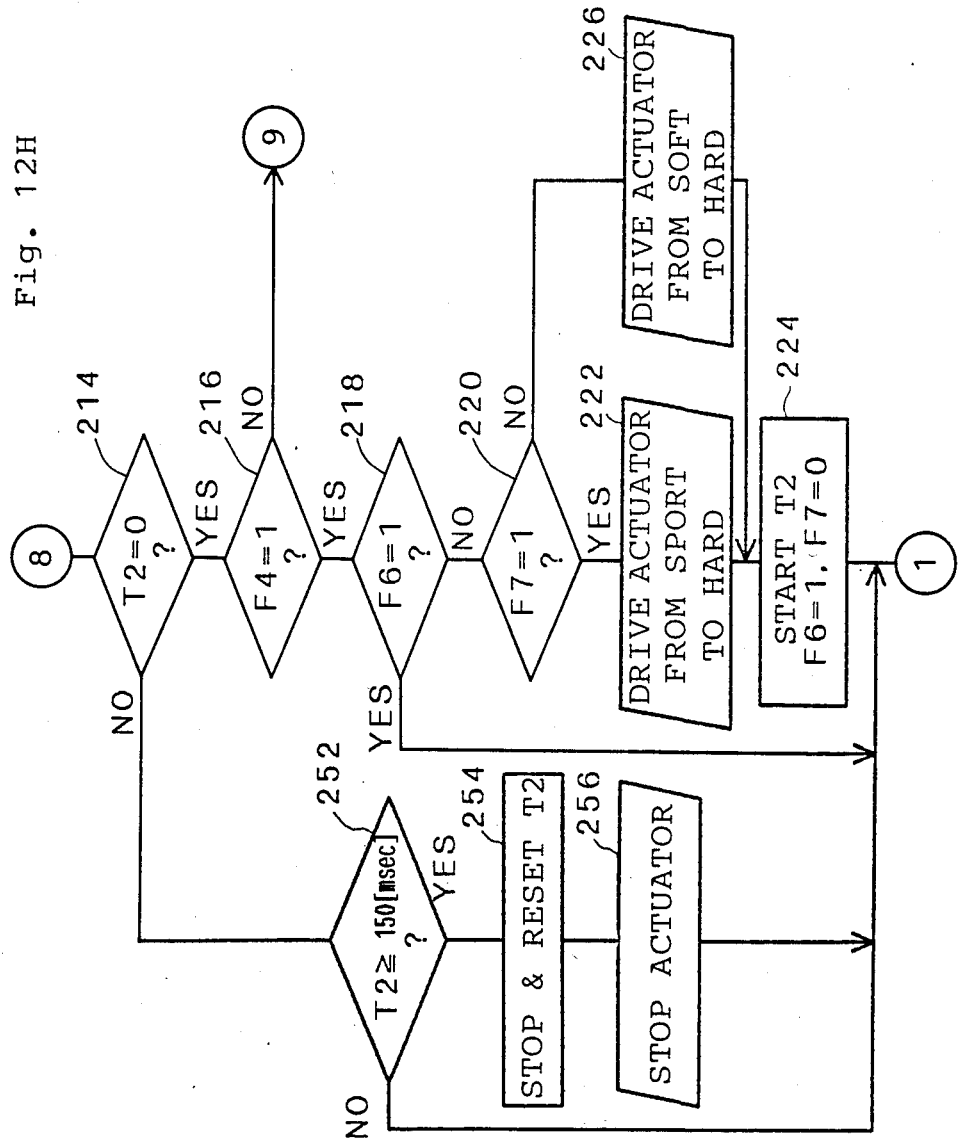

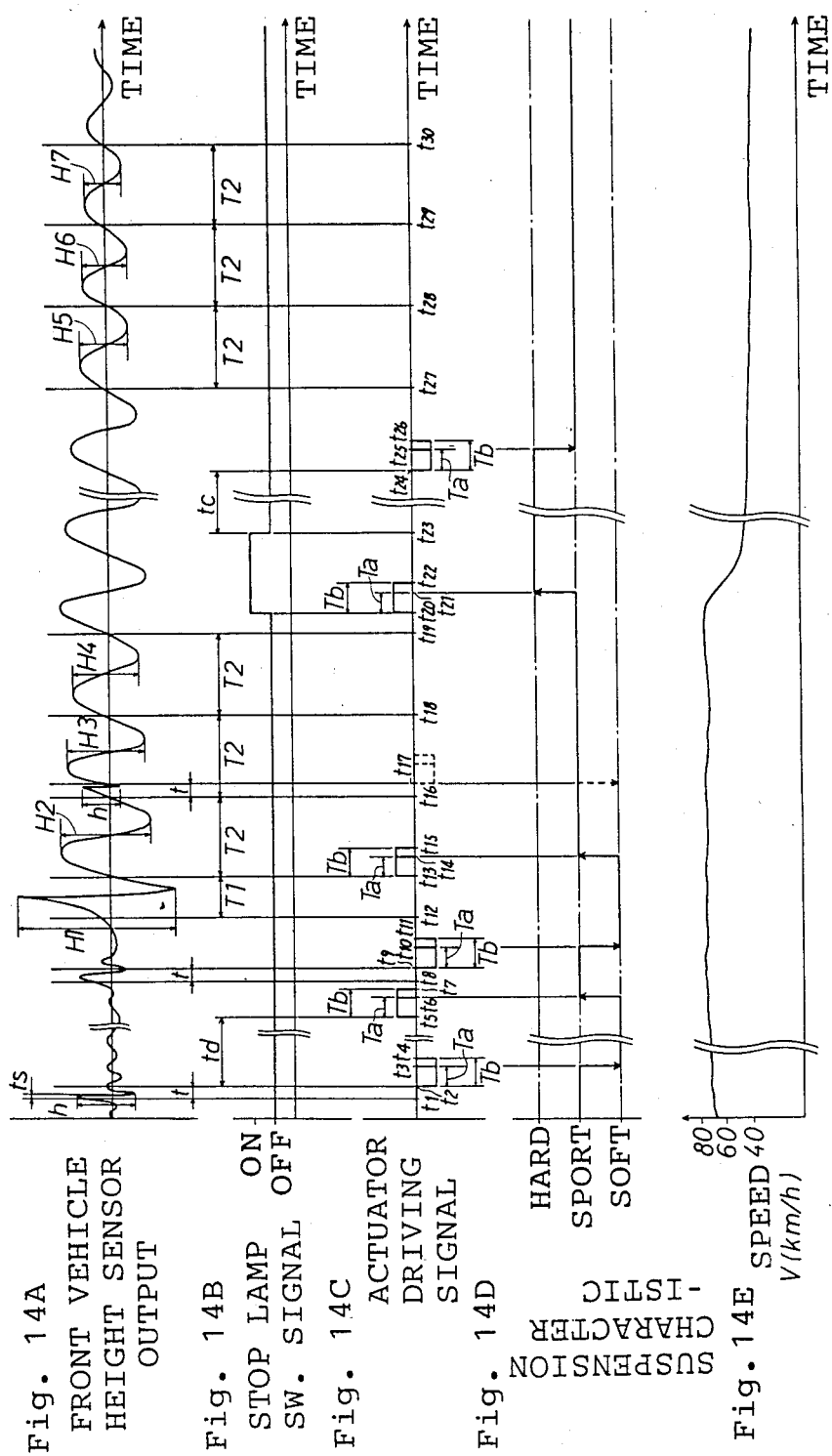

SUSPENSION CONTROLLER

BACKGROUND OF THE INVENTION

This invention relates to a suspension controller for a vehicle, and more particularly to a suspension controller which has the order of priority among various suspension controls.

In order to reduce shocks to a vehicle body depending upon the road condition and running condition of the vehicle, and furthermore to maintain control and high stability of the vehicle, various suspension controllers have been proposed. The suspension controller controls a suspension system, installed between a body and its wheels, by altering the spring constant, damping force, bush characteristic, stabilizer characteristic or the like. For example, the following suspension controllers have been provided: one which controls a suspension system by altering the spring constant of the air spring of the suspension system in response to the road condition (Japanese Published Unexamined Patent Application No. Sho-59-26638); one by altering both of the spring constant of the air spring and the damping force of the shock absorber (Japanese Published Unexamined Patent Application No. Sho-59-23712); one by altering the damping force of the shock absorber (Japanese Published Unexamined Patent Application No. Sho-58-30542); one by altering the bush characteristic or the stabilizer characteristic (Japanese Published Unexamined Patent Application No. Sho-58-26605 and Japanese Published Unexamined Utility Model Application No. Sho-59-129613).

The suspension control in response to the road condition is accomplished, for example, as follows. The suspension controller successively detects a distance between a wheel and the vehicle body as a vehicle height, compares a change of the vehicle height with a predetermined condition and, when the change satisfies the condition, alters the suspension characteristic so as to reduce a shock to the vehicle body. On the other hand, the suspension control in response to the running condition of the vehicle is accomplished, for example, as follows. The suspension controller detects a vehicle speed and a steering angle from sensors or detects a throttle valve opening or a brake action, compares each detected value with a predetermined condition and, when the value satisfies the condition, alters the suspension characteristic so as to stabilize the vehicle attitude.

SUMMARY OF THE INVENTION

The prior art suspension controllers described above, however, have various problems.

Since there are various predetermined conditions for the suspension control in response to the road condition, it may occur, for example, that a plurality of contradictory commands for altering the suspension characteristic are simultaneously generated based on the change of vehicle height values detected by one vehicle height sensor. The alteration direction for the suspension characteristic such as to a harder state or to a softer state and the alteration timing vary according to the predetermined condition. Since there is a problem such that it cannot be determined which predetermined condition for the suspension control should have preference to the others, the suspension characteristic might be altered in the inadequate direction. If it happens, the drivability and stability of the vehicle are lowered and the riding comfort deteriorates because of uncomfortable vibrations.

When the suspension controls in response to the running condition of the vehicle and the road condition are simultaneously instructed, there is also the same problem as above. In this case, if the suspension characteristic is altered to a softer state, the vehicle attitude is abruptly changed, thus lowering the drivability and the stability of the vehicle.

Accordingly, one object of the invention is to provide an improved suspsension controller which has the order of priority among the suspension controls when two or more different suspension controls are simultaneously instructed, so as to optimally control the suspension characteristic acccording to both of the road condition and the running condition of the vehicle.

Another object of the invention is to provide a suspension controller which preferentially alters the suspension characteristic to a harder state when a plurality of suspension controls are simultaneously instructed so as to reduce the vibration of the vehicle body and to prevent an abrupt change of the vehicle attitude in response to the road condition and the running condition of the vehicle, thus maintaining good control, high stability and riding comfort.

Still another object of the invention is to provide a suspension controller which has a plurality of control sections each having a determination condition of its own so as to accurately control the suspension characteristic in response to the vehicle attitude and the road condition, thus providing good control and high stability that is compatible with good riding comfort.

In order to achieve these and other objects, a suspension controller for a vehicle according to this invention includes, as shown in FIG. 1, vehicle attitude detection means M1 for detecting at least one of either a vehicle height or a driving condition of the vehicle; control means M3 including a plurality of control sections each having a proper determination condition, each control section comparing the detected result of the vehicle attitude detection means M1 with its determination condition and, if the result satisfies the condition, outputting a command to alter the suspension characteristic; preference means M4 for selecting a command for altering the suspension characteristic to the hardest state among the commands outputted from the control sections of the control means M3; and suspension characteristic alteration means M2 for altering the suspension characteristic according to the command outputted from the preference means M4.

The vehicle attitude detection means M1 detects, for example, a distance between a wheel and the vehicle body as a vehicle height and/or detects a driving condition of the vehicle. For example, the detection means M1 may detect, as a vehicle height, a displacement of a suspension arm by a potentiometer to output it in the form of an analog signal, or the displacement as a rotational angle of a grated disc to output it in the form of a digital signal. The detection means M1, for example, may be constructed from a speed sensor for detecting a vehicle speed, a steering sensor for detecting a steering angle, a stop-lamp switch for detecting a braking, a throttle position sensor for detecting an acceleration, a neutral-start switch for detecting a start of the vehicle and the like, so as to detect the driving condition of the vehicle. The detection means M1 may be constructed to detect both the vehicle height and the driving condition of the vehicle.

The suspension characteristic alteration means M2 alters the suspension characteristic according to a command from the preference means M4 by altering, for example, the spring constant of the suspension spring, the damping force of the shock absorber, the bush stiffness or the stabilizer stiffness discretely or continuously. For example, in an air suspension, the spring constant may be varied by connecting or disconnecting a main air chamber with/from an auxiliary air chamber. The damping force may be raised or lowered by altering the diameter of an orifice which controls oil flow in the shock absorber. The suspension characteristic is altered, for example, tno "HARD", to "SPORT" or to "SOFT" by varying the spring constant, damping force, the bush stiffness or the stabilizer stiffness. Here, "HARD", "SOFT" and "SPORT" respectively show a hardest state, a softest state and a middle state of the suspension characteristic.

The control means M3 consists of a plurality of control sections each having a proper determination condition. For example, the control means M3 includes a shock control section, an attitude control section and a vibration control section. The shock control section ouputs a command for altering the suspension characteristic to a softer state when determining that a difference between the maximum value and the minimum value of the vehicle height, which is detected at every predetermined time interval by the vehicle attitude detection means M1 for a predetermined, rather short shock judgment time period, is greater than a reference value. The attitude control section outputs a command for altering the suspension characteristic to a harder state when, judging from the driving condition as detected at every predetermined time interval by the vehicle attitude detection means M1, determining that the vehicle attitude is about to be abruptly changed. The vibration control section outputs a command for altering the suspension characteristic to a harder state (but no harder than the harder state set by the attitude control section) when determining that a difference between the maximum value and the minimum value of the vehicle height, detected at every predetermined time interval by the vehicle attitude detection means M1 for a predetermined vibration judgment time period which is longer than the shock judgment time period, is greater than a reference value.

The above control means M3 and the preference means M4 may be realized as logic circuits of discrete electronic elements, or may be realized as integrated logic circuits including a CPU (Central Processing Unit), A ROM (Read Only Memory), a RAM (Random Access Memory) and other peripheral circuitry chips so as to instruct the alteration of the suspension characteristic in accordance with predetermined process steps.

Since the suspension controller according to the invention includes the preference means M4 as described above, there is not such a problem that commands outputted from a plurality of control sections conflict with each other. Thus, the suspension characteristic can be optimally controlled in response to the road condition and running condition of the vehicle.

BRIEF DESCRIPTION OF DRAWINGS

The invention may be best understood by reference to the following detailed description of preferred embodiments and the accompanying drawings, wherein like numerals denote like elements and in which:

FIGS. 11A, 11B, 11C and 11D define the relationship between the suspension characteristic and the start and end conditions of each control of an attitude control in the embodiment;

FIGS. 12A, 12B, 12C, 12D, 12E, 12F, 12G, 12H and 12I are flow charts showing process steps executed by the ECU of FIG. 5 in the embodiment;

FIGS. 14A, 14B, 14C, 14D and 14E are timing charts respectively showing the front vehicle height sensor output, the stop-lamp switch signal, the suspension characteristic alteration actuator driving current, the suspension characteristic and the vehicle speed each against the elapsed time in the automobile of FIG. 13;

FIGS. 15 through 20 show other examples of units for altering the suspension characteristic;

DETAILED DESCRIPTION OF PREFERRED EMBODIMENTS

Hereinafter, preferred embodiments will be described in detail according to the drawings.

Figure 1:
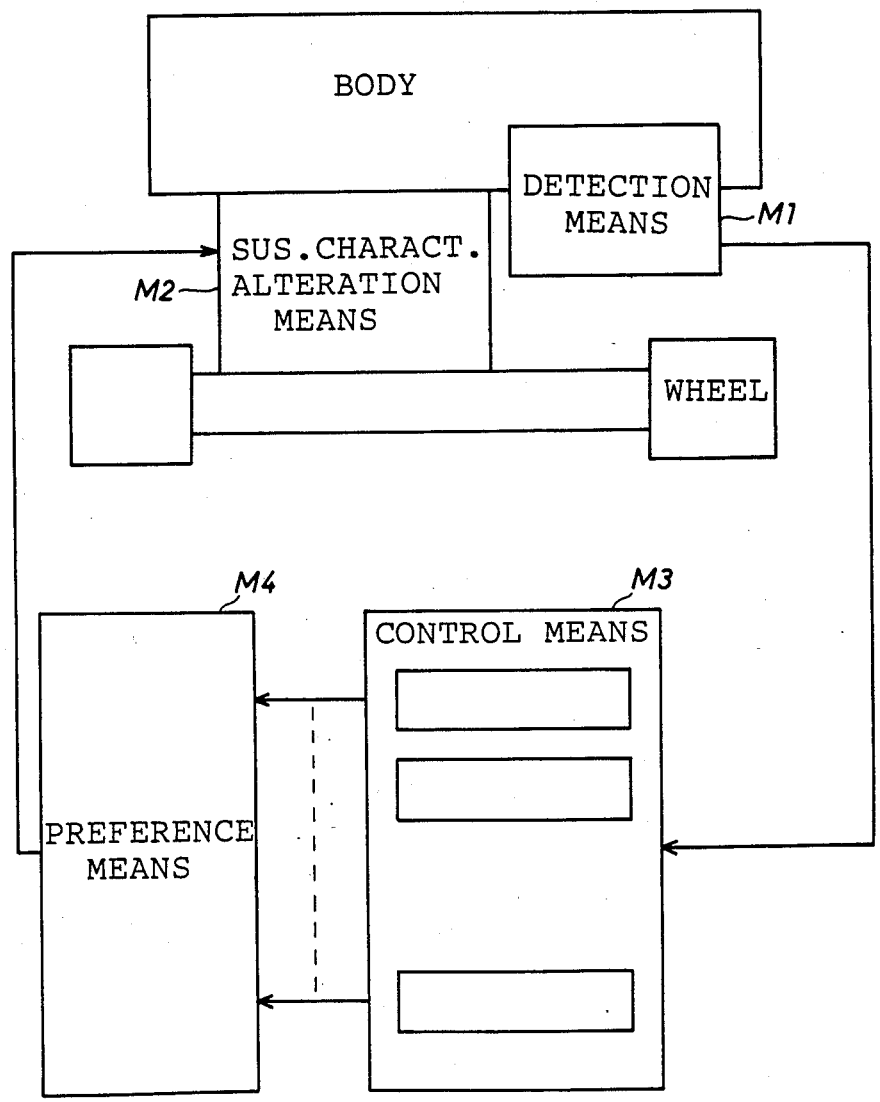
FIG. 1 is a schematic view of a basic structure embodying the present invention.
Figure 2:
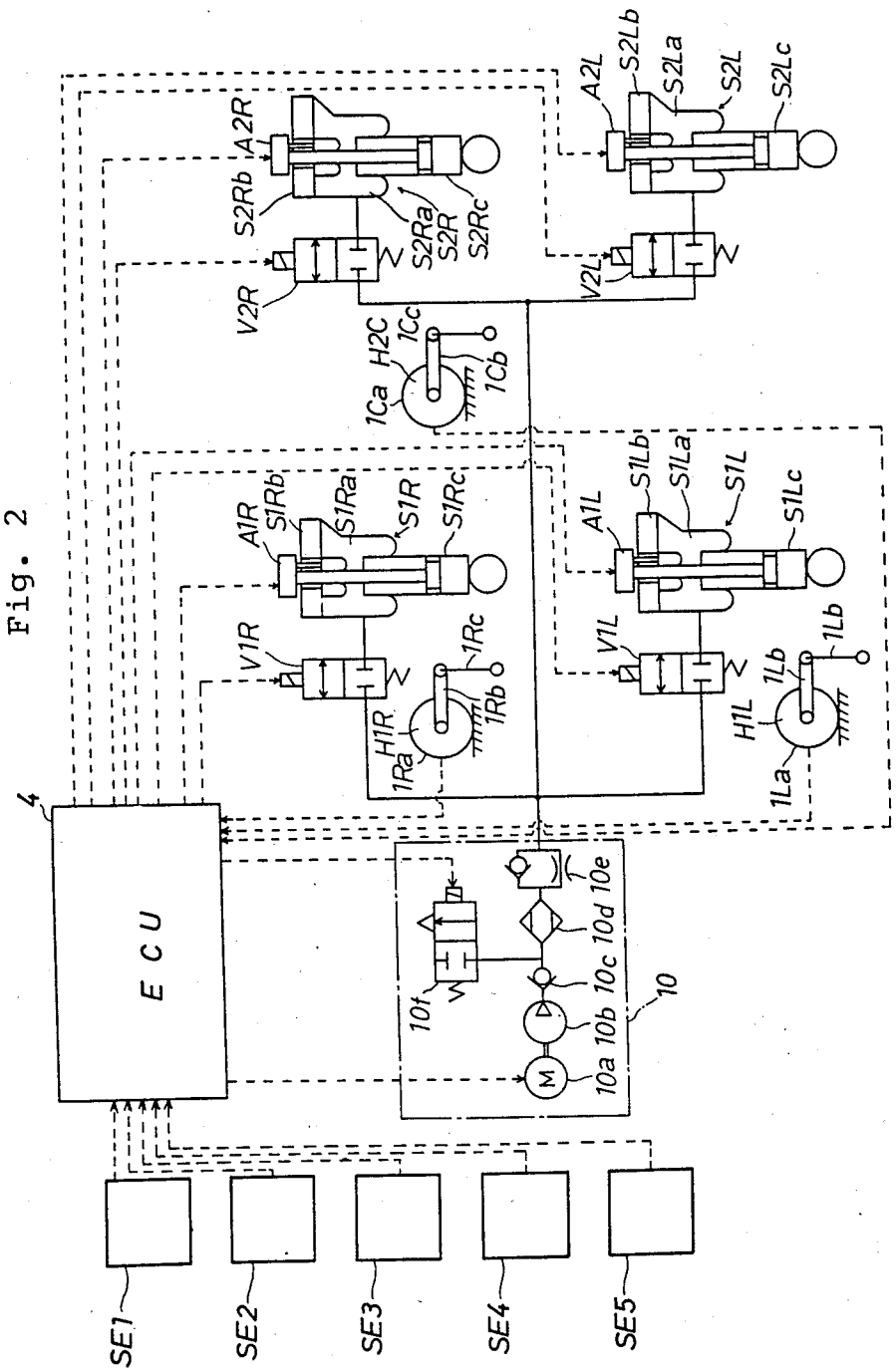
FIG. 2 is a systematic view illustrating a suspension controller of a preferred embodiment according to the invention.

FIG. 2 shows details of a suspension controller for a vehicle, having air suspensions, according to one embodiment of the invention. A right front vehicle height sensor H1R is provided between a vehicle body and a right front wheel to detect the distance between the vehicle body and a right suspension arm which follows the motion of the wheel. A left front vehicle height sensor H1L is provided between the vehicle body and a left front wheel to detect the distance between the vehicle body and a left suspension arm. A rear vehicle height sensor H2C is provided between the vehicle body and a rear wheel to detect the distance between the vehicle body and a rear suspension arm. Short cylindrical bodies 1Ra, 1La and 1Ca of the vehicle height sensors H1R, H1L and H2C are secured on the vehicle body. Links 1Rb, 1Lb and 1Cb respectively extend substantially perpendicularly from each center shaft of the bodies 1Ra, 1La and 1Ca. Turnbuckles 1Rc, 1Lc and 1Cc are rotatably coupled to each end of the links 1Rb, 1Lb and 1Cb that extends out of the bodies 1Ra, 1La and 1Ca respectively. The other ends of the turnbuckles 1Rc, 1Lc and 1Cc opposite the links are rotatably coupled to parts of the suspension arms.

The vehicle height sensors H1R, H1L and H2C are provided with a plurality of light interrupters for detecting the vehicle height change as 4-bit data by operating a disc so as to switch on and off the light interrupters in response to changes in the vehicle height, thus outputting a digital signal. The disc is substantially coaxial with the center shaft of the vehicle height sensor and defines a slit thereon.

The following is an explanation of air suspensions S1R, S1L, S2R and S2L. The air suspension S2L is provided between the left rear suspension arm and the vehicle body in parallel with a suspension spring (not shown). The air suspension S2L includes a main air chamber S2La functioning as an air spring, an auxiliary air chamber S2Lb, a shock absorber S2Lc, and an actuator A2L for altering the spring constant of the air spring and damping force of the shock absorber. Other air suspensions S1R, S1L and S2R have the same construction and function as the air suspension S2L, and are provided for the right front wheel, the left front wheel, and the right rear wheel, respectively.

A compressed air feed and discharge system 10 connected to each air spring of the air suspensions S1R, S1L, S2R and S2L operates a motor 10a to drive a compressor 10b for generating compressed air. The compressed air blows from the compressor 10b to an air drier 10d via a check valve 10c. The air drier 10d dries the compressed air supplied for the air suspensions S1R, S1L, S2R and S2L, and protects every part of the air suspensions S1R, S1L, S2R and S2L from moisture.

The air drier 10d also prevents abnormal pressure changes which would accompany phase changes in main air chambers S1Ra, S1La, S2Ra and S2La and auxiliary air chambers S1Rb, S1Lb, S2Rb and S2Lb of the air suspensions. In a check valve 10e, the compressed air blows from the compressor 10b side to each of the air suspensions S1R, S1L, S2R and S2L side. The check valve 10e opens its checking portion in feeding the compressed air, and closes it in discharging the compressed air, thus discharging the compressed air only through the fixed portion thereof. A discharging valve 10f is an electromagnetic valve of 2-port 2-position spring offset type. The discharging valve 10f is normally in the closed position as shown in FIG. 2. In discharging the compressed air from the air suspensions S1R, S1L, S2R and S2L, the valve 10f is open to discharge the compressed air to the atmosphere via the check valve 10e and the air drier 10d.

Air spring feed and discharge valves V1R, V1L, V2R and V2L function to adjust the vehicle height, and are provided between the air suspensions S1R, S1L, S2R and S2L, and the above-mentioned compressed air feed and discharge system 10, respectively. The air spring feed and discharge valves V1R, V1L, V2R and V2L are electromagnetic valves of 2-port 2-position spring offset type. These valves are normally in the closed positions shown in FIG. 2, and are open while adjusting the vehicle height. When the air spring feed and discharge valves V1R, V1L, V2R and V2L are open, the main air chambers S1Ra, S1La, S2Ra and S2La are connected with the compressed air feed and discharge system 10. If the compressed air is fed from the system 10, the volumes in the main air chambers S1Ra, S1La, S2Ra and S2La are increased so as to raise the vehicle height, and if the air is discharged because of the vehicle weight itself, the volumes thereof are decreased so as to lower the vehicle height. On the other hand, if the feed and discharge valves V1R, V1L, V2R and V2L are closed, the vehicle height remains unchanged. As described above, it is possible to change the volumes of the main air chambers S1Ra, S1La, S2Ra and S2La of the air suspensions so as to adjust the vehicle height by operating the discharge valve 10f and the air spring feed and discharge valves V1R, V1L, V2R and V2L.

A neutral-start switch SE1 is provided in an automatic transmission of a vehicle and outputs a signal corresponding to each setting such as Parking (P) or Neutral (N) of the automatic transmission. A stop-lamp switch SE2 is provided in a brake pedal bracket and outputs a stop lamp switch signal when a driver steps on the brake pedal. A throttle position sensor SE3 is installed in a throttle body and outputs a signal corresponding to the displacement of an accelerator pedal. A steering sensor SE4 is provided in the lower part of a steering column and outputs a signal corresponding to the steering direction and the polar angle of a steering wheel. A speed sensor SE5 is provided in a speedometer and outputs a pulse signal in response to the vehicle speed.

The signals outputted from the vehicle height sensors H1R, H1L and H2C, the neutral-start switch SE1, the stop-lamp switch SE2, the throttle position sensor SE3, the steering sensor SE4 and the speed sensor SE5 are inputted to an Electronic Control Unit (ECU) 4. The ECU 4 derives data from the signals to process them and outputs a control signal to the actuators A1R, A1L, A2R and A2L of the air suspensions, to the air spring feed and discharge valves V1R, V1L, V2R and V2L, and to the motor 10a and the discharging valve 10f of the compressed air feed and discharge system 10 so as to optimally control them.

Figure 3:
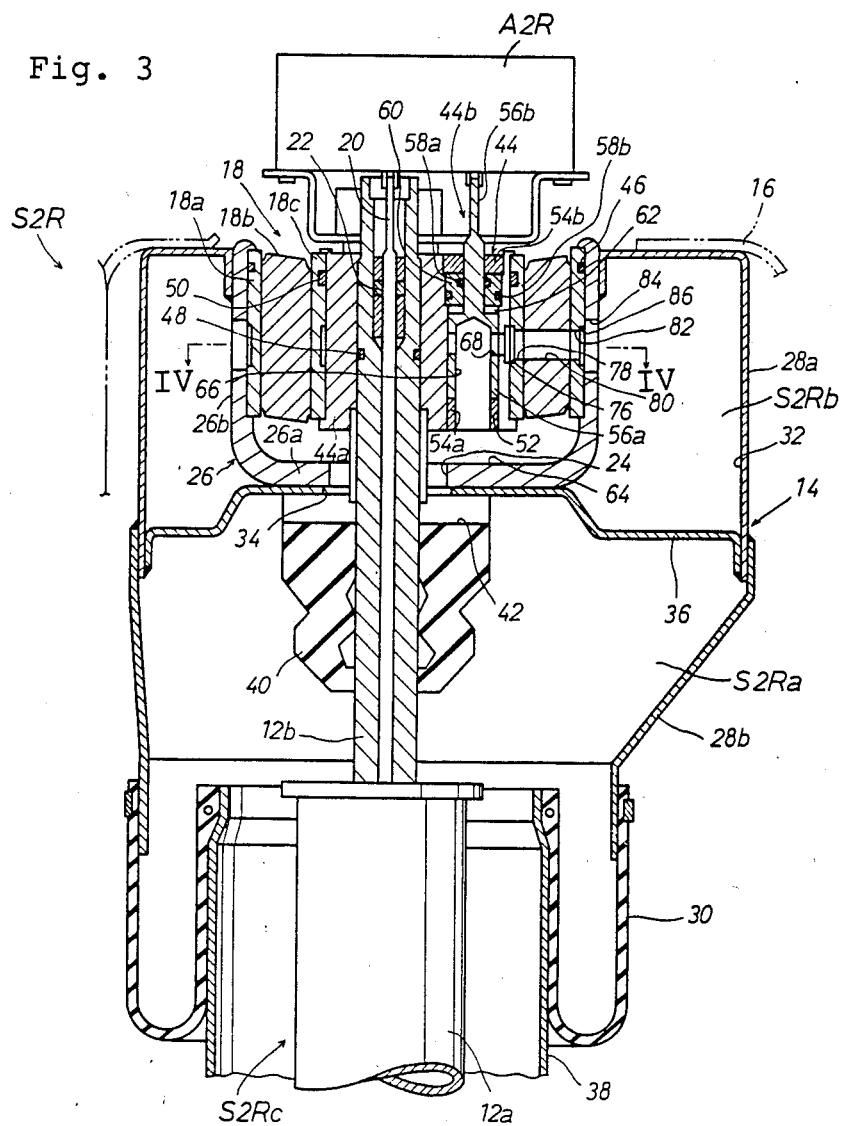
FIG. 3 is a sectional view showing main parts of the air suspension of FIG. 2.
Figure 4:
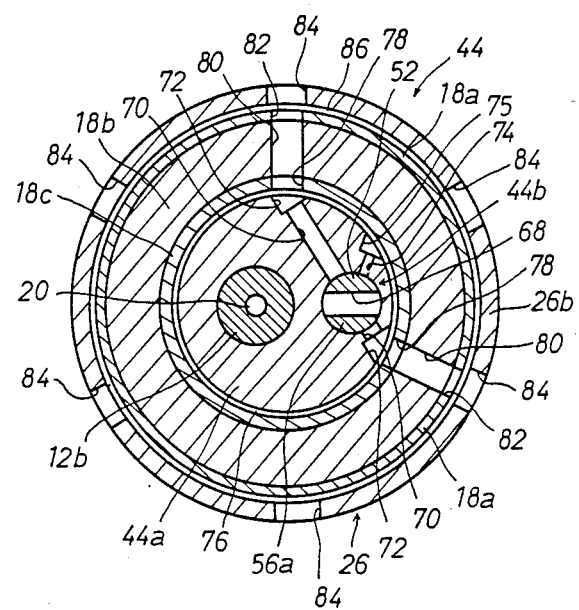
FIG. 4 is a cross sectional view of the air suspension, taken on line IV—IV of FIG. 3.

The following is an explanation of the main part of the air suspensions S1R, S1L, S2R and S2L based on FIGS. 3 and 4. Since each suspension has the same construction as the others, here, the right rear air suspension S2R is described.

The air suspension S2R includes a shock absorber S2Rc having a piston and a cylinder 12a, and an air spring unit 14 provided in connection with a shock absorber S2Rc, as shown in FIG. 3.

An axle (not shown) is supported at the lower end of the cylinder 12a of the shock absorber S2Rc. An elastic cylindrical assembly 18 for elastically supporting a piston rod 12b against the vehicle body 16 is provided at the upper end of the piston rod 12b extending from the piston (not shown) slidably fitted within the cylinder 12a. The shock absorber S2Rc controls its damping force by operating on the valve function of the piston. A control rod 20 for controlling the damping force is liquid-tightly and rotatably fitted with a sealing member 22 in the piston rod 12b.

The air spring unit 14 has a chamber 32 which is defined by a circumferential member 26, an upper housing member 28a, a lower housing member 28b, and a diaphragm 30. The circumferential member 26 includes a bottom 26a having an opening 24, in which the piston rod 12b is inserted, and a wall 26b rising from the peripheral portion of the bottom 26a. The upper housing member 28a covers the circumferential member 26 and is secured onto the vehicle body. The lower housing member 28b is open at the lower end and is coupled to the lower end of the upper housing member 28a. The diaphragm 30 includes an elastic material which closes the lower end of the lower housing member 28b. The chamber 32 is divided into a lower main air chamber S2Ra and an upper auxiliary air chamber S2Rb by a partition member 36, which is secured onto the bottom 26a of the circumferential member 26 and which has an opening 34 corresponding to the opening 24 provided in the bottom 26a. Both the chambers S2Ra and S2Rb are filled with compressed air. The partition member 36 is provided with a rubber buffer 40 which can be brought into contact with the upper end of the cylinder 12a. The rubber buffer 40 has a passage 42 for connecting the openings 24 and 34 to the main air chamber S2Ra. The elastic cylindrical assembly 18 is disposed inside the circumferential member 26 whose wall 26b defines the inside circumferential surface of the auxiliary air chamber S2Rb, in such a manner that the assembly 18 surrounds the piston rod 12b.

The cylindrical elastic assembly 18 is provided with a valve unit 44 for controlling the connection of both air chambers S2Ra and S2Rb. The assembly 18 includes an outer cylinder 18a, a cylindrical elastic member 18b and an inner cylinder 18c which are disposed concentrically to each other. The cylindrical elastic member 18b is secured to both the cylinders 18a and 18c. The outer cylinder 18a is pressfitted on the wall 26b on the circumferential member 26 secured on the vehicle body by means of the upper housing member 28a. A valve casing 44a of the valve unit 44, into which the piston rod 12b is inserted, is secured on the inner cylinder 18c. Since the piston rod 12b is secured on the valve casing 44a, the piston rod is elastically connected to the vehicle body by means of the cylindrical elastic assembly 18. An annular air sealing member 46 is tightly packed in between the outer cylinder 18a and the wall 26b of the member 26. An annular air sealing member 48 is tightly packed in between the piston rod 12b and the valve casing 44a. An annular air sealing member 50 is tightly packed in between the inner cylinder 18c and the valve casing 44a.

The valve casing 44a has a hole 52 which is open at both ends and which extends in parallel with the piston rod 12b. A rotary valve 44b is rotatably supported in the hole 52. The valve 44b includes a main portion 56a, which can be brought into contact with a lower positioning ring 54a provided at the lower end of the hole 52, and a smalldiameter operating portion 56b projecting from the main portion above the elastic cylindrical assembly 18. An upper positioning ring 54b is provided at the upper end of the hole 52 and cooperates with the lower positioning ring 54a to prevent the valve 44b from dropping out of the hole 52. An annular sealing base 60, holding an inner air sealing member 58a and an outer air sealing member 58b for tightly closing the hole 52, is provided between the upper positioning ring 54b and the main portion 56a of the valve 44b. A friction reducer 62 for smoothing the revolution of the valve 44b, when the main portion 56a of the valve is pushed towards the sealing base 60 by air pressure, is provided between the sealing base 66 and the main portion 56a of the valve 44b.

A chamber 64 is formed in the lower portion of the elastic cylindrical assembly 18 and is connected with the main air chamber S2Ra by means of the openings 24 and 34 and the passage 42 of the rubber buffer 40. The main portion 56a of the valve 44b has a recess 66 open to the chamber 64, and has a connection passage 68 extending through the main portion 56a in a diametrical direction thereof across the recess 66.

The valve casing 56b, which houses the valve 56a, has a pair of air passages 70, each of which can connect at one end with the connection passage 68, as shown in FIG. 4. The air passages 70 extend outwards in a diametrical direction to the hole 52 toward the peripheral surface of the valve 44b. The other end of each air passage 70 is open to the peripheral surface of the valve casing 44a through a face hole 72. An air passage 74, which can connect at one end with the connection passage 68 of the hole 52, extends toward the peripheral surface of the valve casing 44a on the same plane, substantially, as the pair of air passages 70 and in between them. The diameter of the air passage 74 is smaller than that of each of the air passages 70. The other end of the air passage 74 is open to the peripheral surface of the valve casing 44a through a face hole 75. The inside circumferential surface of the inner cylinder 18c, covering the peripheral surface of the valve casing 44a, has an annular recess 76 which surrounds the peripheral surface of the valve casing 44a in order to connect the face holes 72 and 75 of the air passages 70 and 74 to each other.

The inner cylinder 18c has openings 78 which are open to the recess 76 which constitutes an annular air passage. The cylindrical elastic member 18b has through holes 80, which extend radially outwards from the member 18b corresponding to the openings 78. The through holes 80 are open to the peripheral surface of the outer cylinder 18a through openings 82 of the cylinder so that the openings 78 and 82 and the through holes 80 define an air passage including the air passages 70 and extending through the elastic cylindrical assembly 18.

The peripheral surface of the wall 26b of the circumferential member 26 covering the outer cylinder 18a is provided with plural openings 84, which are located at equal intervals along the outside surface of the member 26 and which are open to the auxiliary air chamber S2Rb so as to connect the openings 78 and 82 and the through holes 80 with the auxiliary air chamber S2Rb. The peripheral surface of the outer cylinder 18a is provided with an annular recess 86, which surrounds the outer cylinder at the openings 82, so as to connect the openings 84, 78 and 82 and the through holes 80 to each other. The openings 84 are open to the recess 86 constituting an annular air passage.

In the embodiment shown in FIG. 4, the positions of the openings 78 and 82 and the through holes 80 are defined by the positions of the two air passages 70 of the valve casing 44a. The air passages 70 and 74 can be optionally provided in positions along the outside surface of the elastic member 18b since the annular recess 76, with which the air passages 70 and 74 are connected, is formed between the inner cylinder 18c and the valve casing 44a.

The control rod 20 for controlling the damping force of the shock absorber S2Rc, and the actuator A2R for rotating the rotary valve 44b of the valve unit 44, are provided at the upper end of the piston rod 12b, as shown FIG. 3.

Since the air suspension S2R has the above-mentioned construction, the air suspension functions as described hereinafter.

When the valve 44b is kept in a closed position as shown in FIG. 4 so that the connection passage 68 of the valve is shut off from any of the air passages 70 and 74 of the valve casing 44a, the main air chamber S2Ra and the auxiliary air chamber S2Rb are disconnected from each other, thus the spring constant of the suspension S2R is set at a large value.

When the actuator A2R rotates the valve 44b into such a position that the connection passage 68 of the valve connects with the large-diameter air passages 70 of the valve casing 44a, the main air chamber S2Ra is connected with the auxiliary air chamber S2Rb through the connection passage 68, the large-diameter air passages 70, the openings 78 and 82 and the through holes 80 of the elastic assembly 18 and the openings 84, thus the spring constant of the suspension S2R is set at a small value.

When the valve 44b is rotated into such a position by the actuator A2R that the connection passage 68 of the valve connects with the small-diameter air passage 74 of the valve casing 44a, the main air chamber S2Ra is connected with the auxiliary air chamber S2Rb through the connection passage 68, the small-diameter air passage 74, the annular recess 76, the openings 78 and 82 and the through holes 80 of the elastic assembly 18 and the openings 84, thus setting the spring constant of the suspension S2R at an intermediate value. This is because the small-diameter air passage 74 provides a higher air flow resistance than the large-diameter air passages 70.

Figure 5:
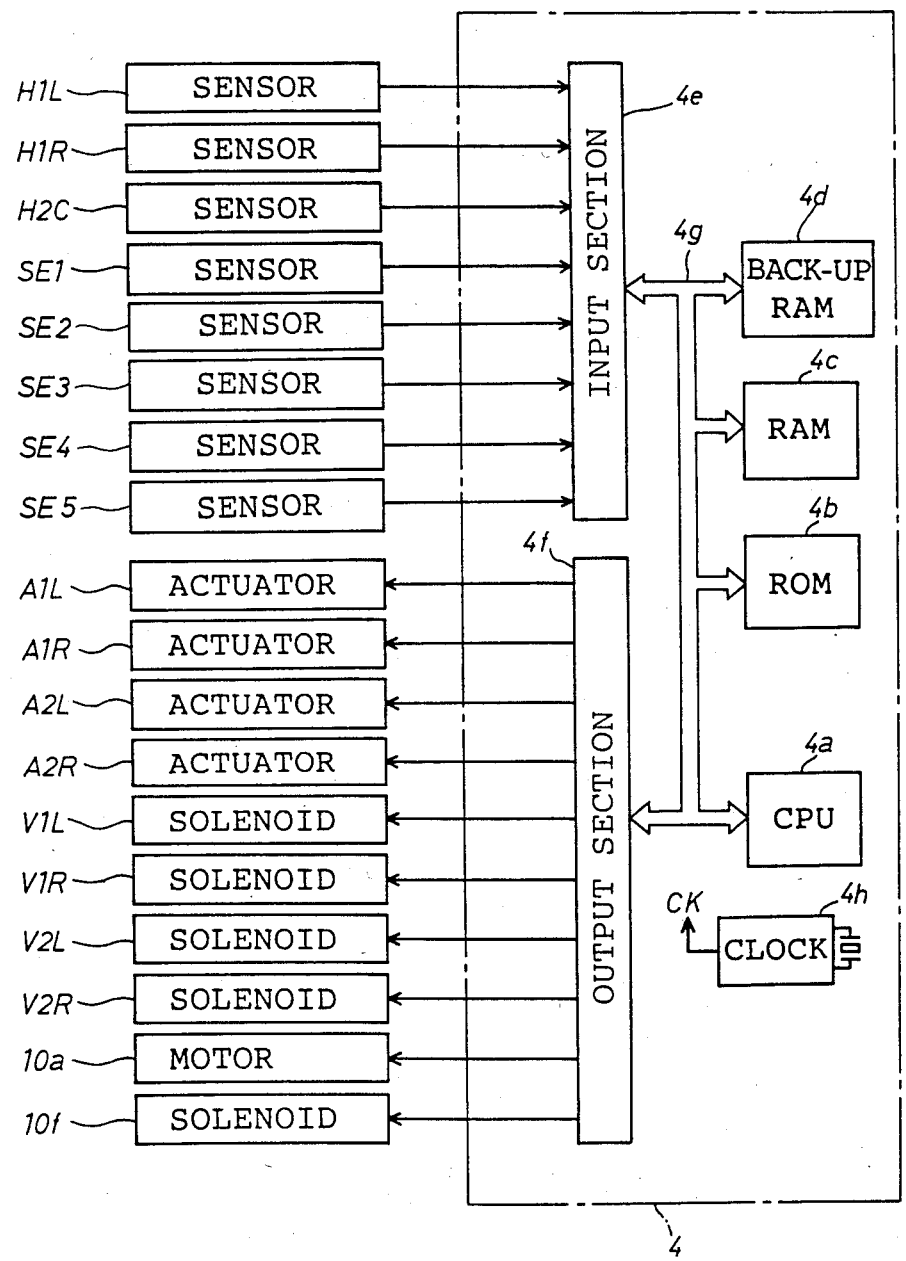
FIG. 5 is a block diagram illustrating a construction of the Electronic Control Unit (ECU) of FIG. 2.

FIG. 5 shows the construction of the ECU 4. The ECU 4 includes a Central Processing Unit (CPU) 4a, a Read Only Memory (ROM) 4b, a Random Access Memory (RAM) 4c, a back-up Random Access Memory (back-up RAM) 4d, an input section 4e, an output section 4f, a bus line 4g and a clock circuit 4h. The CPU 4a receives output data from the sensors to process them according to a control program for controlling various apparatus or the like. In the ROM 4b, the control program and initial data are stored. The RAM 4c functions to write and read out data, which the ECU 4 receives for the control. The backup RAM 4d is backed up by a battery so as to retain data even if the ignition key switch of the automobile is turned off. The input section 4e includes an input port (not shown), a wave-shaping circuit (as occasion demands), a multiplexer which selectively sends out output signals from the sensors to the CPU 4a, and an A/D converter which converts an analog signal into a digital signal. The output section 4f includes an output port (not shown), and a drive circuit for driving the actuators according to the control signal of the CPU 4a as occasion demands. The bus line 4g connects the element, such as the CPU 4a, the ROM 4b, and the input and the output sections 4e and 4f, with each other so as to transmit data from each element. The clock circuit 4h sends out a clock signal at a predetermined time intervals to the CPU 4a, the ROM 4b, the RAM 4c, etc to provide the controlled timing.

Figure 6:
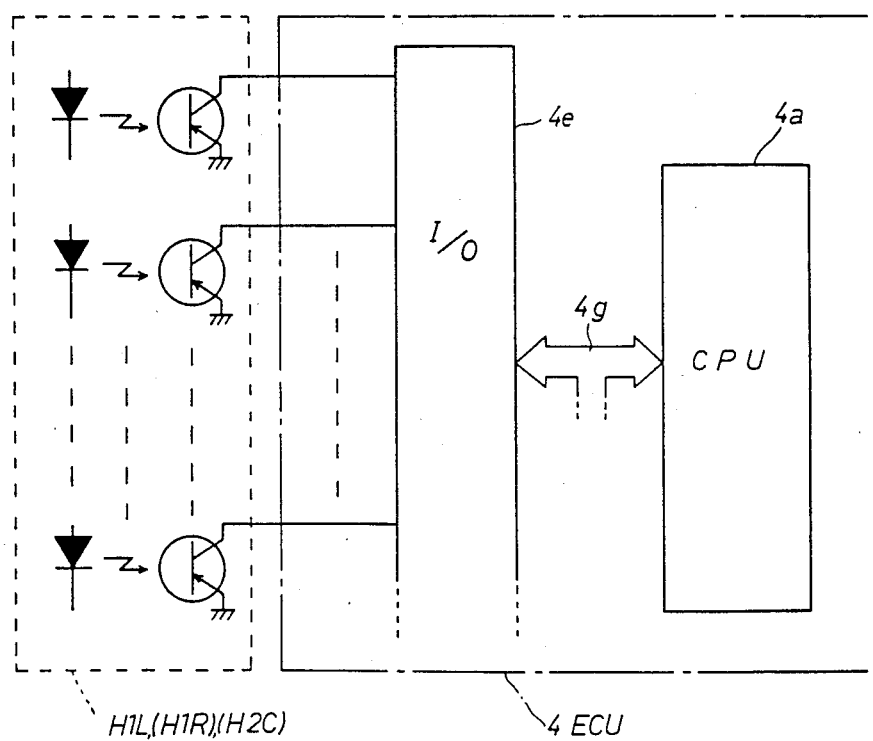
FIG. 6 is a block diagram illustrating an example of a digital type of the vehicle height sensor and the signal input circuit of FIG. 2.
Figure 7:
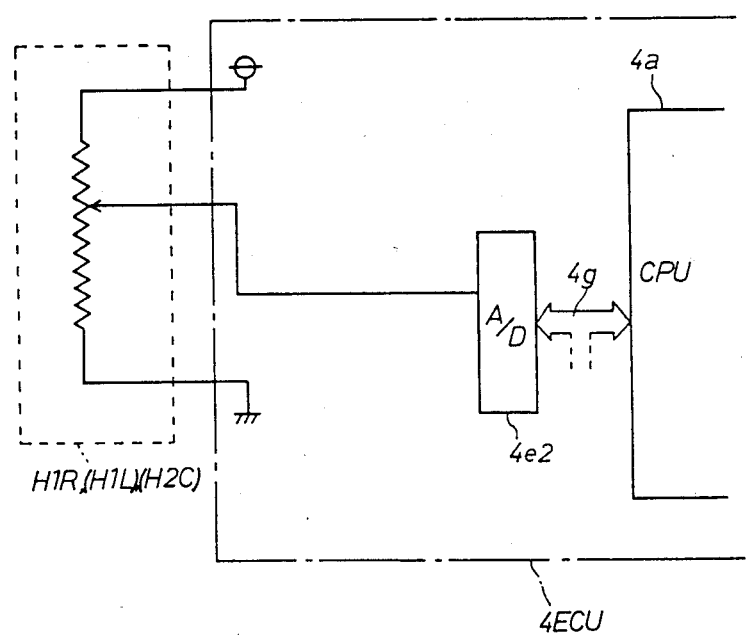
FIG. 7 is a block diagram illustrating an example of an analog type of the vehicle height sensor and the signal input circuit of FIG. 2.

If the signals outputted from the vehicle height sensors H1R, H1L and H2C are 4-bit digital signals, they are transmitted to the CPU 4a via the input section 4e as shown in FIG. 6. On the contrary, if analog signals, they are converted into digital ones by the A/D converter 4e2 and are then transmitted to the CPU 4a through the bus line 4g as shown in FIG. 7.

Figure 8:
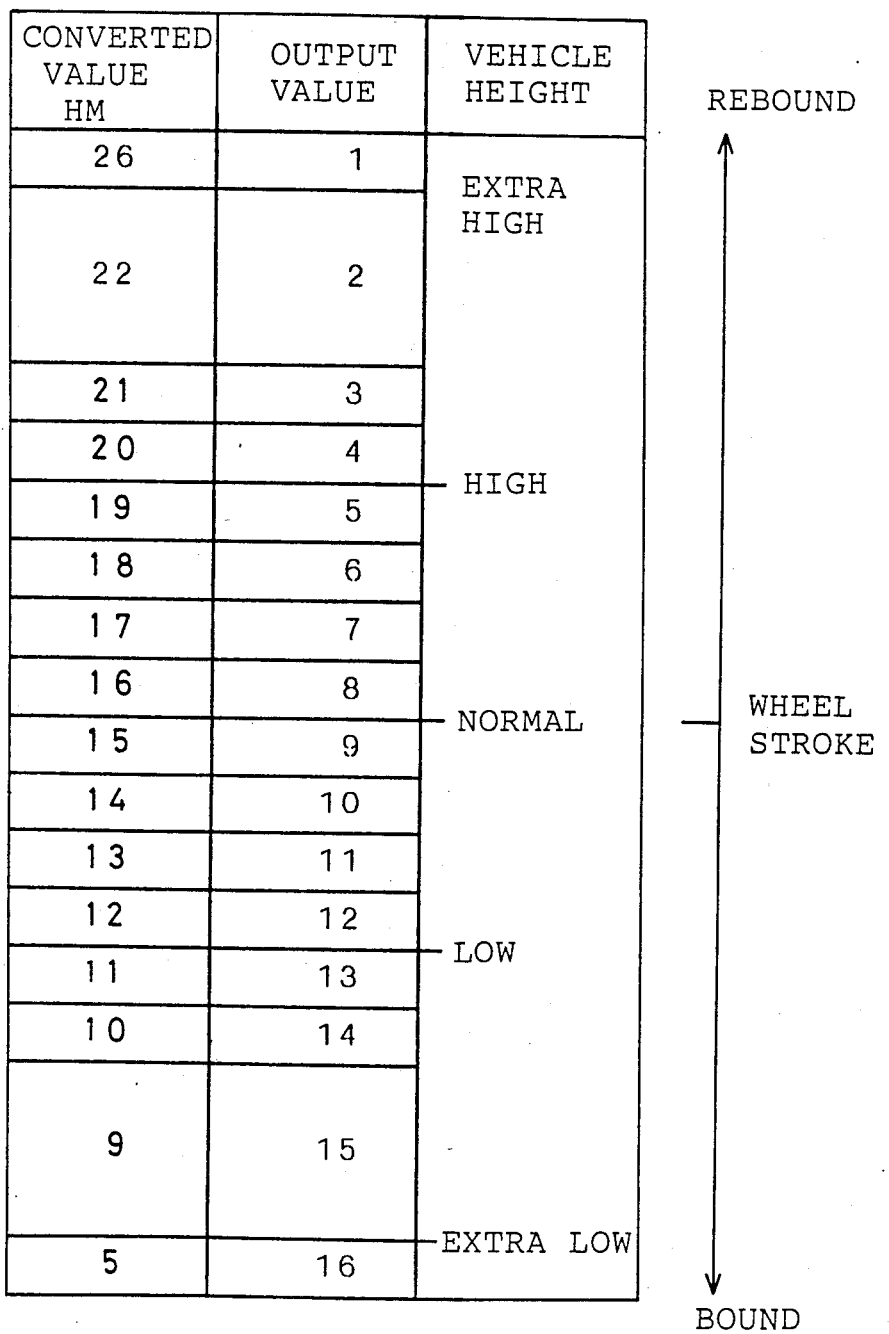
FIG. 8 is a table which defines the relationship between the vehicle height sensor output value and the vehicle height converted value in the embodiment.

A converted vehicle height HM used in the embodiment is now described based on FIG. 8. The front vehicle height sensors H1L and H1R respectively detect the distance between the front wheel and the vehicle body, and output one of sixteen digital values (1 through 16), represented by 4-bit data, corresponding to the current vehicle height. If wheels bound from riding over a bump, a value corresponding to the low position or the extra low position of the vehicle height is outputted. On the contrary, if the wheels rebound from riding through a dip, a value corresponding to the high position or the extra high position of the vehicle height is outputted. The relationship between the output value of the vehicle height sensor and the converted vehicle height is defined as shown in the table of FIG. 8. The ECU 4 converts the output values from the front vehicle height sensors H1L and H1R to the converted values HM based on the table previously stored in the ROM 4b. The subsequent judgment on the vehicle height change is performed based on the converted vehicle height HM. In the table, the converted values HM of the vehicle height near the extra high position or the extra low position are defined in unequal intervals so as to prevent bottoming-out or the like.

Figure 9:
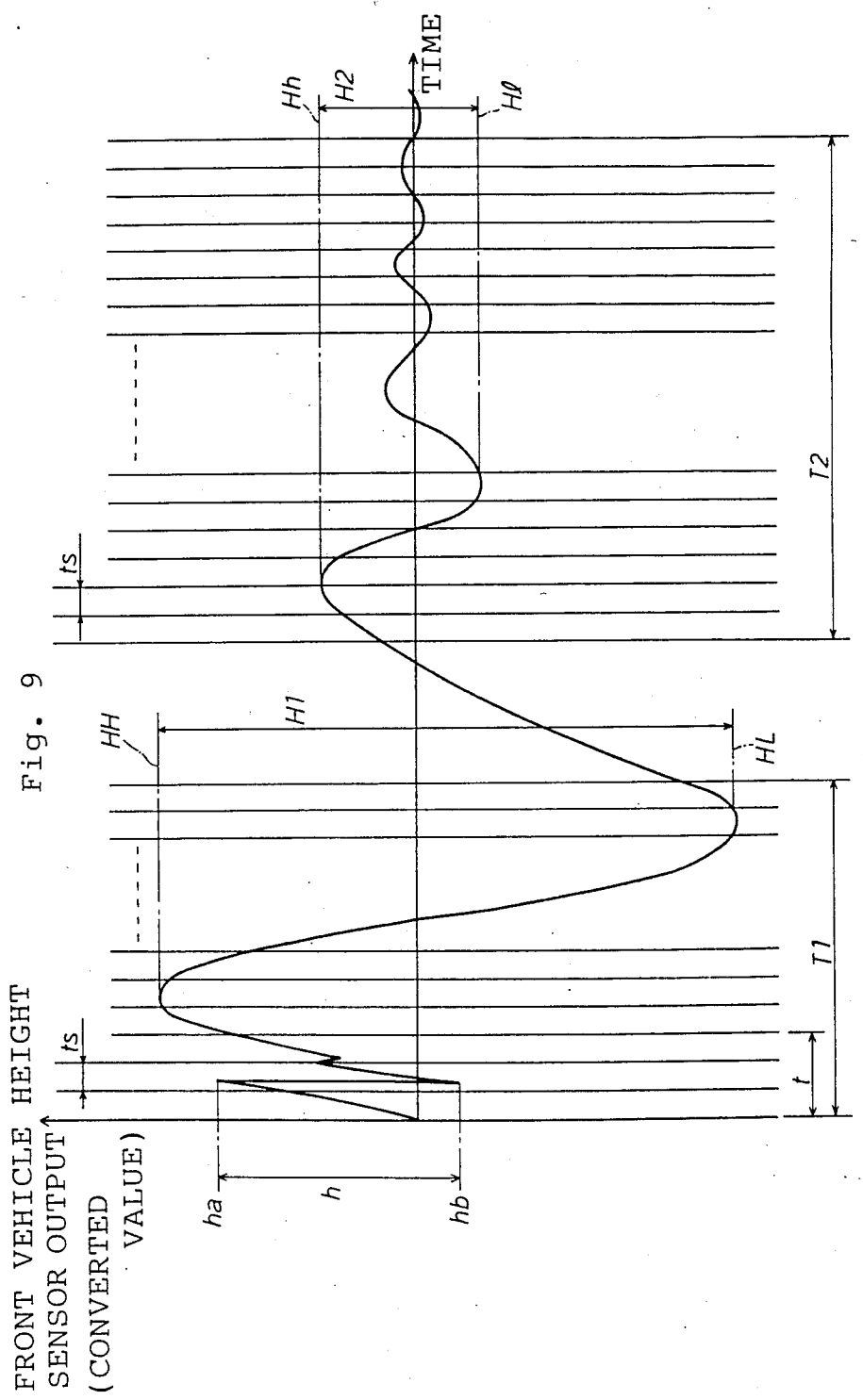
FIG. 9 illustrates the relationship between the vehicle height change and the detection time, and between the change and each judgment time in the embodiment.

The relationship between the converted vehicle height and the detection time and the relationship between the converted vehicle height and each judgment time are explained based on FIG. 9. In the figure, ts is a time interval for detecting the vehicle height at the front vehicle height sensors H1L and H1R (8 msec. in this embodiment), and t is a shock judgment time period for judging if there is a shock to the vehicle by means of the vehicle height values which are detected at every time interval ts. The time period t is defined as follows.

$$t = (n-1) \times ts \tag{1}$$

n: the number of the detected vehicle height values for judging a shock to the vehicle In this embodiment, n is equal to 4, and t is set to a time period shorter than or equal to a cycle time of the resonant vibration or unsprung mass. The time period t also satisfies the inequality (2).

$$t <= Tr - Ta \quad (2)$$

Tr: a time difference between the front wheels and the rear wheels
Ta: a time period for altering the suspension characteristic The time difference Tr is calculated as follows.

$$Tr = WB/V \quad (3)$$

WB: wheelbase
V: vehicle speed

In the shock control of this embodiment, the converted value h of the maximum vehicle height change is computed from the difference between the maximum converted vehicle height ha and the minimum converted vehicle height hb for the time period t. If the maximum change value h is greater than or equal to a predetermined reference value HK1 for judging a shock, the suspension characteristic is altered from "SPORT" to "SOFT", and after a delay time interval td has elapsed, the suspension characteristic is restored from "SOFT" to "SPORT". In this embodiment, the shock judgment reference value HK1 is equal to 5 (the converted value) and the delay time interval td is 2 sec.

T1 is a vibration judgment time period for judging if there is a vibration on the vehicle body, and is defined as equation (4).

$$T1 = (N1 - 1) \times ts \quad (4)$$

N1: the number of the detected vehicle height values for judging the vibration

In this embodiment, N1 is equal to 64 and the time period T1 is set to approximately 0.5 sec. The time period T1 is set to be approximately half of the cycle time (0.8 sec) of the resonant vibration (1.2 to 1.3 Hz) of sprung mass.

To execute the vibration control, the converted value H1 of the maximum vehicle height change is first computed, as shown in equation (5), from the difference between the maximum converted vehicle height HH and the minimum converted vehicle height HL for the time period T1.

$$H1 = HH - HL \quad (5)$$

In the vibration control of this embodiment, if the converted value H1 of the maximum vehicle height change is greater than or equal to a predetermined reference value HK2 for judging a vibration, the suspension characteristic is altered from "SOFT" to "SPORT" or from "SPORT" to "HARD". In this embodiment, the reference value HK2 is equal to 11 (the converted value).

In the vibration control, T2 is a restoration judgment time period for judging if the suspension characteristic is to be restored, and is defined as equation (6).

$$T2 = (N2 - 1) \times ts \quad (6)$$

N2: the number of the detected vehicle height values for judging the restoration of the suspension characteristic In this embodiment, N2 is equal to 83 and the time period T2 is set to approximately 0.66 sec. The time period T2 is set to be less than the cycle time (0.8 sec) of the resonant vibration of sprung mass.

In the vibration control, to restore the suspension characteristic, the converted value H2 of the maximum vehicle height change is first computed, as shown in equation (7), from the difference between the maximum converted vehicle height Hh and the minimum converted vehicle height Hλ for the time period T2.

$$H2 = Hh - H\lambda \quad (7)$$

In the vibration control of this embodiment, if the converted value H2 of the maximum vehicle height change is determined more than three times to be greater than or equal to a predetermined reference value HK3 for judging the restoration of the suspensionn characteristic, the suspension characteristic is kept in the "SPORT" state or is restored from "HARD" to "SPORT". In this embodiment, the reference value HK3 is equal to 8 (the converted value).

Figure 10:
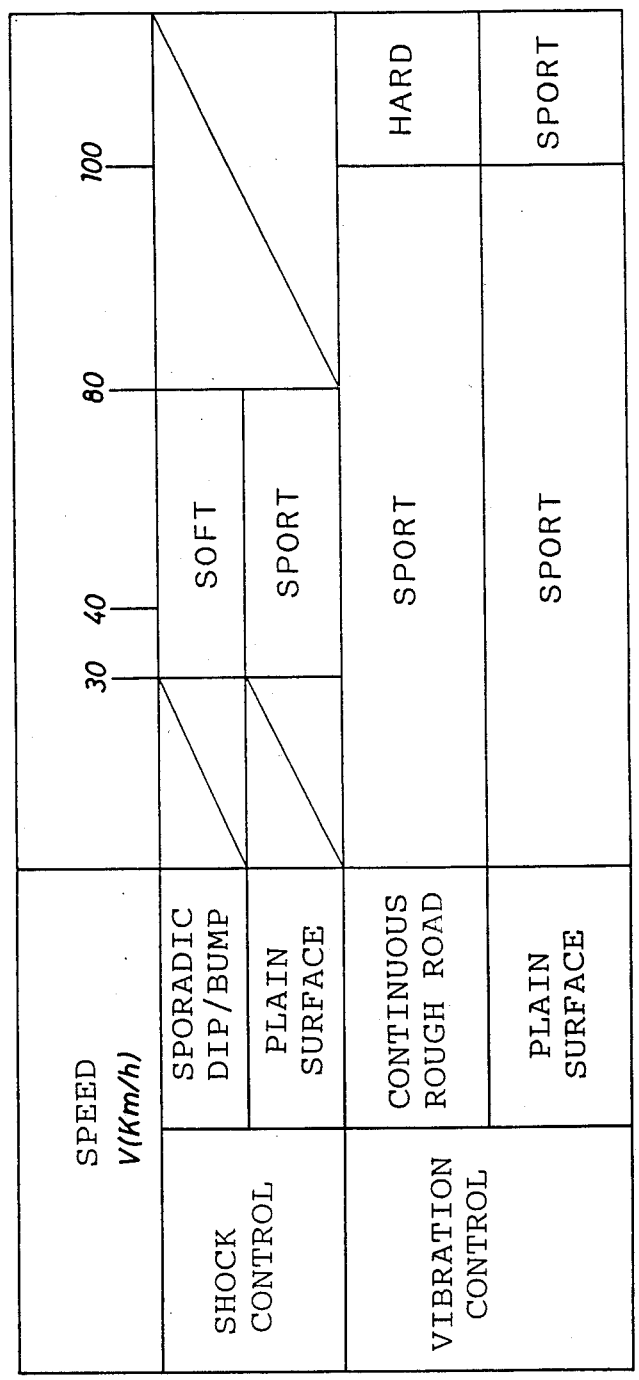
FIG. 10 is a table which illustrates the relationship between the vehicle speed and the suspension characteristic in a shock control and a vibration control of the embodiment.

The vehicle speed responsiveness of the suspension control adopted in this embodiment is explained based on FIG. 10. FIG. 10 is a table showing the relationship between the vehicle speed and the suspension characteristic in the shock control and in the vibration control.

In the shock control, while the vehicle speed V is greater than or equal to 30 Km/h and less than 80 Km/h, and if the vehicle rides over a sporadic bump or through a sporadic dip in the road surface, the suspension characteristic is set to "SOFT", but on the contrary, if the vehicle runs on a plain road surface, the suspension characteristic is set to "SPORT".

In the vibration control, while it is determined that the vehicle is running on a continuously rough road, and if the vehicle speed is less than 100 Km/h, the suspension characteristic is set to "SPORT", but if the speed is greater than or equal to 100 Km/h, the suspension characteristic is set to "HARD". On the other hand, when it is determined that the vehicle is running on a plain road surface, the suspension characteristic is always kept in "SPORT".

The relationship between the suspension characteristic and the start and end conditions of various vehicle attitude controls executed in this embodiment is shown in FIGS. 11A, 11B, 11C and 11D. In this embodiment, there are four kinds of vehicle attitude controls, i.e., the anti-roll control, the anti-squat control, the anti-dive control and the anti-shift-squat control.

In the anti-roll control, as shown in FIG. 11A, the suspension characteristic is altered to "HARD" is response to the steering condition so as to reduce the rolling of the vehicle body during cornering, and after that, is restored to "SPORT" or "SOFT". As shown in the map of FIG. 11B, the steering condition is divided into 5 regions based on the relationship between the steering angle and the vehicle speed. The map of FIG. 11B is previously stored in the ROM 4b. The anti-roll control is started when one of the following conditions is satisfied; the first start condition is that the steering condition is changed from a region X0 to another region X2 or X3; the second start condition is that the steering condition is changed to another region X4 and the vehicle speed is greater than or equal to 40 Km/h. This anti-roll control is concluded when one of the following conditions is satisfied; the first end condition is that 2 sec has elapsed since the first start condition was satisfied; the second end condition is that 2 sec has elapsed since the steering condition was changed from the region X3 to either of the regions, X0, X1, or X2; the third end condition is that 2 sec has elapsed since the vehicle speed became less than 40 Km/h.

In the anti-squat control, as shown in FIG. 11A, when the throttle valve opening is large, the suspension characteristic is altered to "HARD" so as to reduce the squat of the vehicle body during initial movement of the vehicle, and after that, is restored to "SPORT" or "SOFT". A predetermined region Y for the throttle valve opening speed is defined based on the relationship between the vehicle speed and the time for the throttle valve opening change, as shown in the map of FIG. 11C. A predetermined region Z for the throttle valve opening is defined based on the relationship between the vehicle speed and the throttle valve opening, as shown in the map of FIG. 11D. Both the maps are previously stored in the ROM 4b. The anti-squat control is started, when one of the following conditions is satisfied; the first start condition is that the throttle valve opening speed is in the region Y; the second start condition is that the throttle valve opening is in the region Z. This antisquat control is concluded when one of the following conditions is satisfied; the first end condition is that 2 sec has elapsed since the first start condition or the second start condition was satisfied; the second end condition is that the vehicle speed becomes greater than or equal to 30 Km/h.

In the anti-dive control, as shown in FIG. 11A, when the vehicle speed is equal to or greater than a predetermined value and when the brake is applied, the suspension characteristic is altered to "HARD" so as to reduce the dive of the vehicle body, and after that, is restored to "SPORT" or "SOFT". The anti-dive control is started when the vehicle speed is greater than or equal to 60 Km/h and a stoplamp switch is turned on. This anti-dive control is concluded when a time period tc (2 sec in this embodiment) has elapsed since the stop-lamp switch was turned off.

In the anti-shift-squat control, as shown in FIG. 11A, when the vehicle speed is less than a predetermined value and when a shift-lever is operated, the suspension characteristic is altered to "HARD" so as to reduce the squat of the vehicle body caused by the shift operation during resting of the vehicle, and after that, is restored to "SPORT" or "SOFT". The anti-shift-squat control is started, when the vehicle speed is less than 10 Km/h and the neutralstart switch is turned on. This anti-shift-squat control is concluded when the vehicle speed becomes 15 Km/h or when 5 sec has elapsed since the neutral-start switch was turned off.

The suspension control process steps executed by the aforementioned ECU 4 is explained based on the flow charts of FIGS. 12A, 12B, 12C, 12D, 12E, 12F, 12G, 12H and 12I. The program enters the suspension control routine when an "AUTO" mode of a suspension control device is selected by a driver. This routine is repeatedly executed at every predetermined time interval. The outline of the routine is first explained.

(1) If the start condition of the anti-dive control described above is satisfied, the suspension characteristic is then altered to "HARD" with priority as compared to commands by the shock control and the vibration control. (steps 109, 112, 114, 116, 118, 120, 200, 202, 214, 216, 218, 220, 222, 224, 226, 252, 254 and 256)

(2) When the end condition of the anti-dive control is satisfied, the vibration control is executed with priority as compared to the shock control. In the vibration control, the vehicle height is detected at every time interval ts, the maximum vehicle height change value H1 for the vibration judgment time period T1 is computed, and if the value H1 is greater than or equal to the reference value HK2, the suspension characteristic is altered to "SPORT" or "HARD" in response to the vehicle speed. (steps 102, 104, 106, 108, 109, 110, 122, 126, 128, 152, 154, 156, 158, 160, 162, 164, 166, 202, 204, 206, 208, 214, 216, 218, 220, 222, 224, 226, 230, 232, 234, 236, 238, 240, 252, 254 and 256)

(3) In the vibration control, after the suspension characteristics has been altered, the vehicle height is detected at every time interval ts and the maximum vehicle height change value H2 for the restoration judgment time period T2 is successively computed three times. If all the three values H2 are less than the reference value HK3, the suspension characteristic is restored to "SPORT" and the vibration control is concluded. (steps 102, 104, 106, 108, 109, 110, 112, 170, 172, 174, 176, 178, 180, 182, 184, 186, 188, 180, 192, 200, 204, 208, 210, 214, 216, 230, 232, 234, 236, 238, 240, 252, 254 and 256)

(4) Unless either of the anti-dive control and the vibration control is being executed, the shock control is performed. In the shock control, the vehicle height is detected at every time interval ts, the maximum vehicle height change value h for the time period t is computed, and, when the value h is determined to be greater than or equal to the reference value HK1, the suspension characteristic is altered to "SOFT". (steps 102, 104, 106, 108, 109, 110, 112, 130, 132, 134, 136, 138, 140, 142, 144, 200, 204, 210, 212, 214, 216, 230, 242, 244, 246, 248, 250, 252, 254 and 256)

(5) In the shock control, after the suspension characteristic has been altered to "SOFT", if the maximum value h is less than the reference value HK1 throughout the delay time interval td, the suspension characteristic is restored to "SPORT" and the shock control is concluded. (steps 102, 104, 106, 108, 109, 110, 112, 130, 132, 134, 136, 138, 146, 148, 200, 204, 208, 210, 214, 216, 230, 232, 234, 238, 240, 252, 254 and 256)

The details of the suspension control routine are explained hereinafter. At step 100 of FIG. 12A, flags F1, F2, F3, F4, F6 and F7, counters C1, C2, C3, C4, and C5 and timers T1, T2, T3 and T4 are reset to zero, and a flag F5 is set to 1. The flag F1 shows if the anti-dive control is being executed. During the anti-dive control operation, F1 is set to 1. The flag F2 shows if the vibration control is being executed. During the vibration control operation, F2 is set to 1. The flag F3 shows if the shock control is being executed. During the shock control operation, F3 is set to 1. The flag F4 shows the target of the suspension characteristic. When the "HARD" state is the target, F4 is set to 1. The flag F5 slso shows the target of the suspension characteristic. When the "SPORT" state is the target, F5 is set to 1. The flag F6 shows the current condition of the suspension characteristic. When it is in the "HARD" state, F6 is set to 1. The flag F7 also shows the current condition of the suspension characteristic. When it is in the "SPORT" state, F7 is set to 1. The counter C1 counts the number of vehicle height data for judging a shock to the vehicle body while the shock control is executed. The counters C2, C3, C4 and C5 are used in the vibration control. The counter C2 counts the number of vehicle height data for judging a vibration on the vehicle body. The counter C3 counts the number of vehicle height data for judging the restoration of the suspension characteristic. The counter C4 counts how many times the maximum vehicle height change value H2 is computed for the time period T2. The counter C5 counts how many times the value H2 becomes less than the reference value HK3. The timer T1 counts the time interval ts for detecting vehicle height values. The timer T2 counts a time period Tb for driving the actuators for the alteration of the suspension characteristic. The timer T3 counts the delay time interval td in the shock control. The timer T4 counts an elapsed time in the anti-dive control. The program then proceeds to step 102 where the timer T1 starts counting, and at the following steps 104, 106 and 108, the vehicle height is detected at every time interval ts as the aforementioned converted value HM. At step 109, a stop-lamp switch signal is detected.

At the decision point 110 of FIG. 12B, it is determined if the flag F1 is set to 1. In this case, since F1 is reset to zero at step 100, the program cycle proceeds to the decision point 112 at which it is determined if the stop-lamp switch signal is "ON". The following is an explanation of events when the stop-lamp switch signal has been turned "ON" by the braking. In this case, the program proceeds to the decision point 114 at which the vehicle speed V is compared with 60 Km/h. If V is greater than or equal to 60 Km/h, since the anti-dive control start condition is satisfied, the program proceeds to step 116 where the flag F1 is set to 1. At step 118, the flag F3 is reset to zero in order to allow the anti-dive control to have the priority to the shock control, and the timer T3 is stopped from counting and is reset. The timer T4 starts counting at the following step 120.

Figure 12A:
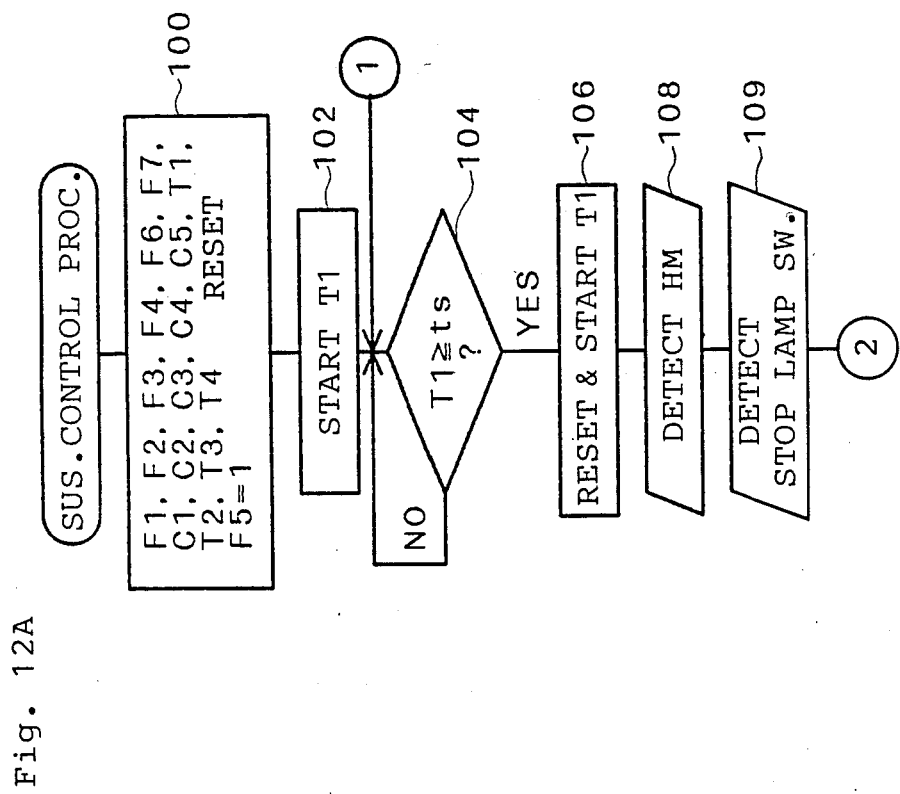
Figure 12C:
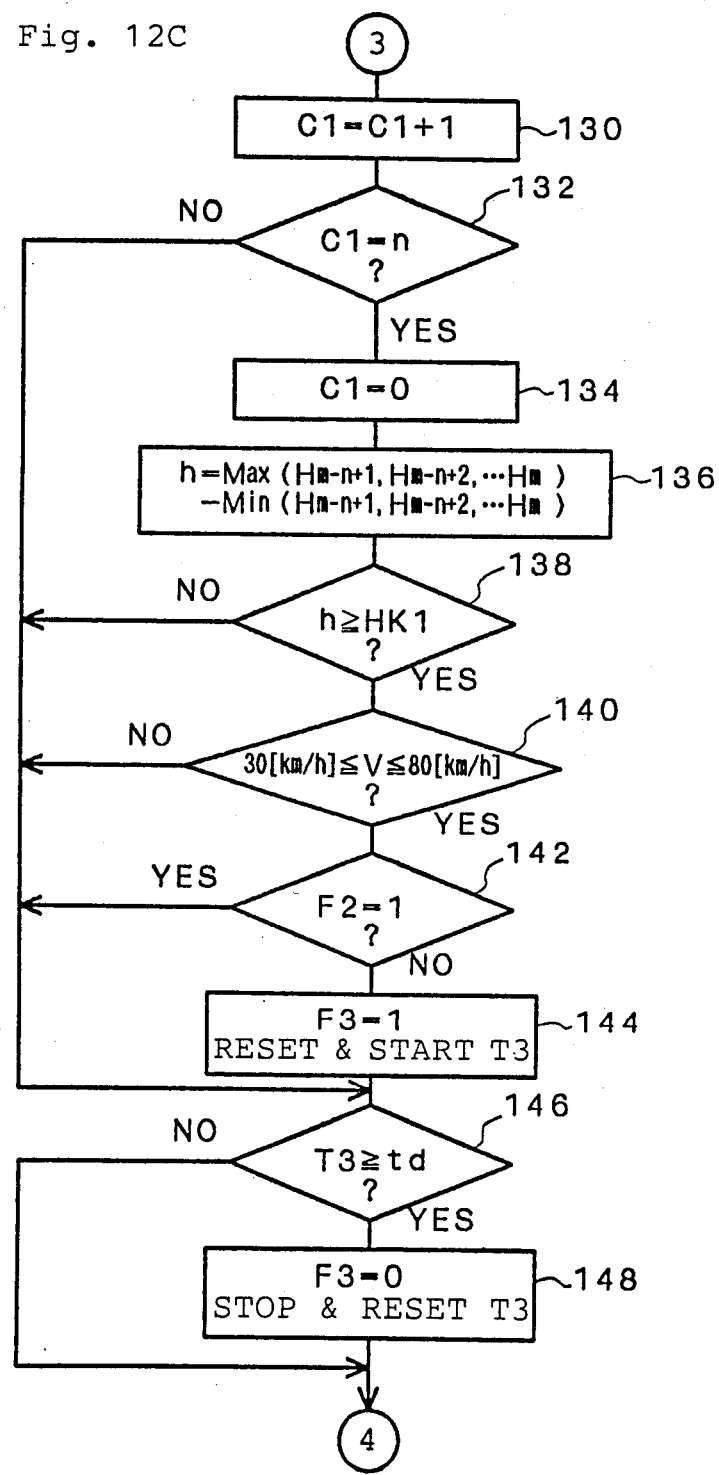
Figure 12D:
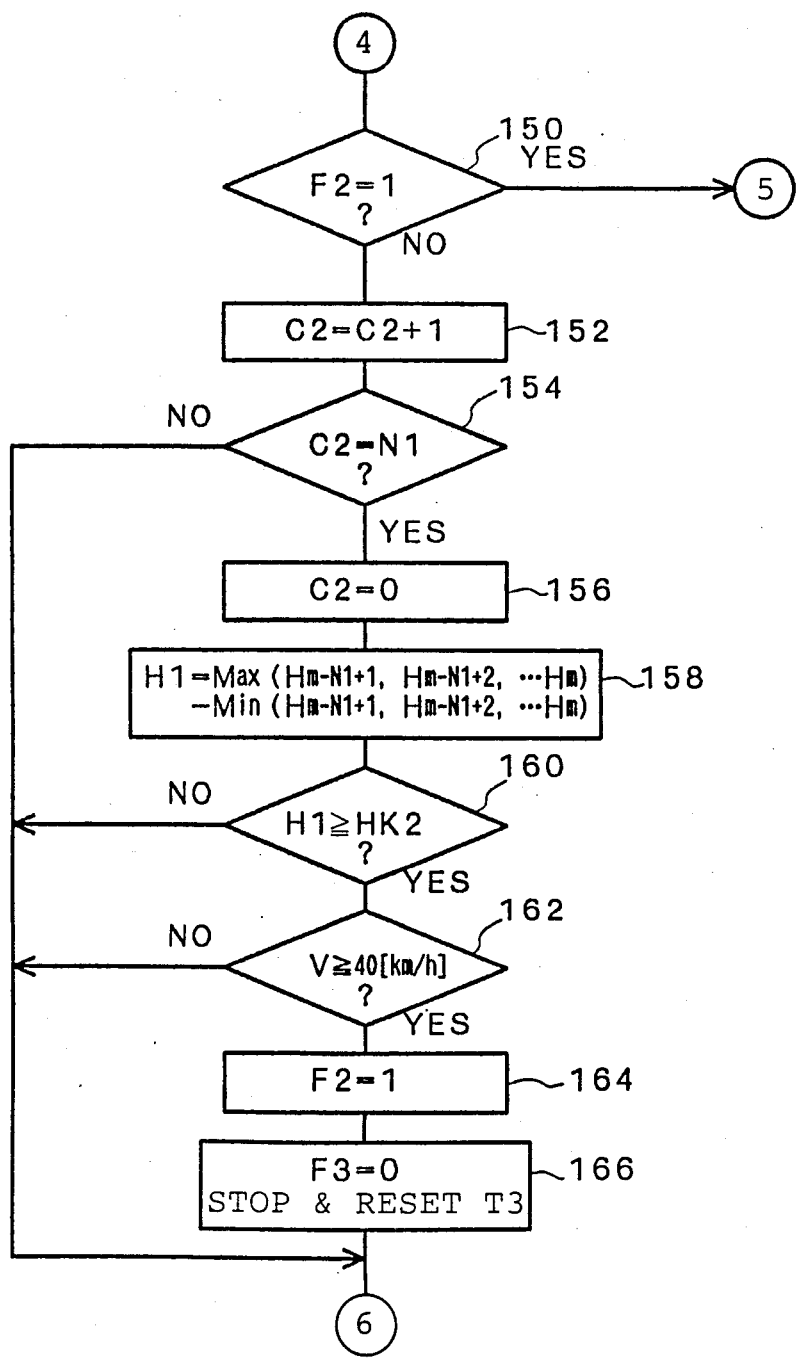

The program cycle then proceeds to step 130 of FIG. 12C where the value in the counter C1 is increased by one. The value in the counter C1 is compared with the number n of detected vehicle height values at the decision point 132. If C1 is less than n, the program then proceeds to the decision point 146 at which the value in the timer T3 is compared with the delay time interval td. Since the counting of the timer T3 is stopped at step 118 during the anti-dive control operation, the value in the timer T3 is less than td and the program proceeds to the decision point 150 of FIG. 12D. At the decision point 150, it is determined if the flag F2 is equal to 1. Since F2 is reset to zero at step 100, the program cycle proceeds to step 152 where the value in the counter C2 is increased by one. At the following decision point 154, the value in the counter C2 is compared with the number N1 of the detected vehicle height values. If the value in the counter C2 is less than N1, the program then proceeds to the decision point 200 of FIG. 12G.

At the decision point 200, it is confirmed, based on the values of the flag F1, that the anti-dive control is being executed. The program cycle then proceeds to step 202 where the flag F4 is set to 1 and the flag F5 is reset to zero. Namely, the target of the suspension characteristic is set to the "HARD" state. At the following steps 214, 216, 218 and 220 of FIG. 12H, it is judged that the suspension characteristic alteration actuators A1L, A1R, A2L and A2R are not activated and that the target of the suspension characteristic is the "HARD" state based on the value of the flag F4, it then being confirmed that the current suspension characteristic is in the "SPORT" state based on the values of the flags F6 and F7. The program then proceeds to step 222 where the suspension characteristic is altered from "SPORT" to "HARD" by activating the actuators A1L, A1R, A2L and A2R. At step 224, the timer T2 starts counting, the flag F6 is set to 1 and the flag F7 is reset to zero. The program cycle then returns to the decision point 104 of FIG. 12A, and after the time period Tb for driving the actuators has elapsed, the actuators A1L, A1R, A2L and A2R are stopped at steps 214, 252, 254 and 256 of FIG. 12H.

The program cycle again returns to the decision point 104 of FIG. 12A. When the brake is released, the stoplamp switch signal becomes "OFF". When the prescribed time period tc (2 sec in this embodiment) has elapsed after the signal became "OFF", the anti-dive control end condition is satisfied, thus the flag F1 is reset to zero (step 109 of FIG. 12A and steps 110, 122, 126 and 128 of FIG. 12B). The program cycle then proceeds to steps 200, 204, 210, 208 of FIG. 12G where the flag F5 is set to 1 so as to set the target of the suspension characteristic to the "SPORT" state. At the following step 214 of FIG. 12H, it is determined that the timer T2 is reset to zero and the program proceeds to the decision point 216. In this case, since the target of the suspension characteristic is set to the "SPORT" state and the flag F4 is reset to zero at step 208 of FIG. 12G, the program then proceeds to the decision point 230 of FIG. 12I. At the decision point 230, it is confirmed that the target of the suspension characteristic is in the "SPORT" state, and at the decision points 232 and 234, it is confirmed based on the values of the flags F6 and F7 that the current suspension characteristic is in the "HARD" state. The program then proceeds to step 236 where the suspension characteristic is altered from "HARD" to "SPORT" by activating the actuators A1L, A1R, A2L and A2R, and at step 238, the timer T2 starts counting, the flag F6 then being reset to zero and the flag F7 being set to 1. The program cycle then once returns to the decision point 104 of FIG. 12A, and after the time period Tb has elapsed, the actuators A1L, A1R, A2L and A2R are stopped at steps 214, 252, 254 and 256 of FIG. 12H and the anti-dive control is concluded.

Unless the anti-dive control is being executed, the vibration control is executed with priority to the shock control. Process steps for the shock control routine are as follows. The vehicle height is detected at every time interval ts as the converted vehicle height HM, and according to the detection of the vehicle height, the counter C2 is increased by one. This detection of the vehicle height is repeatedly executed until the value in the counter C2 becomes equal to the number N1 of the detected vehicle height values (steps 104, 106, 108 and 109 of FIG. 12A, steps 110 and 112 of FIG. 12B and steps 150, 152 and 154 of FIG. 12D). When the value C2 becomes equal to N1, the program cycle proceeds to step 156 of FIG. 12D where the counter C2 is reset to zero. At the following step 158, the difference H1 between the maximum and minimum vehicle height converted values for the time period T1 is computed, and the difference H1 is compared with the reference value HK2 at the decision point 160. If the difference H1 is less than Hk2, the suspension characteristic is kept in the "SPORT" state as mentioned above. On the other hand, if H1 is greater than or equal to HK2, it is judged that a vehicle is running on a continuously rough road. The program then proceeds to the decision point 162 at which the vehicle speed V is compared with 40 Km/h. If V is greater than or equal to 40 Km/h, the program proceeds to steps 164 and 166 where the flag F2 is set to 1, the flag F3 reset to zero and the timer T3 reset. In this case, the vibration control is executed with preference to the shock control.

Figure 12E:
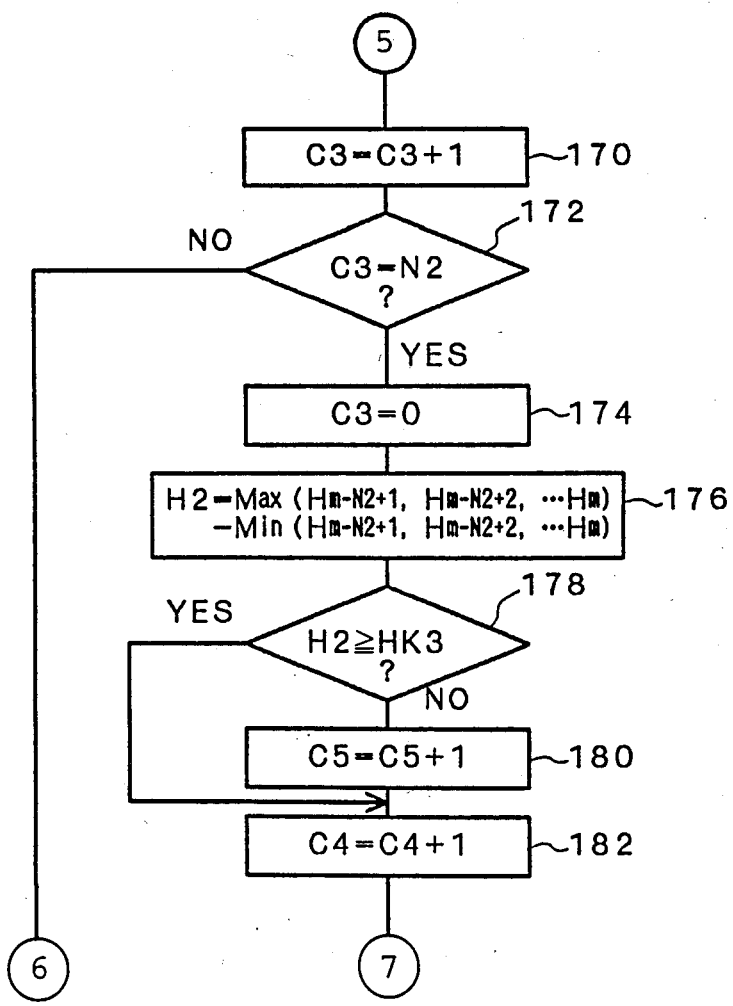
Figure 12E:
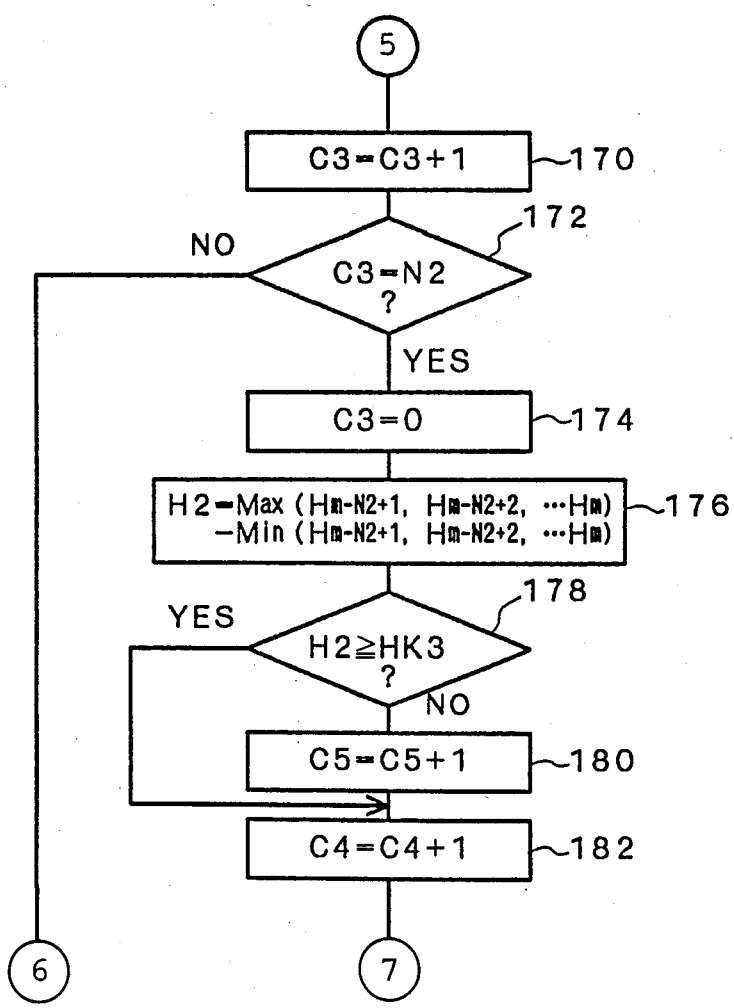
Figure 12G:
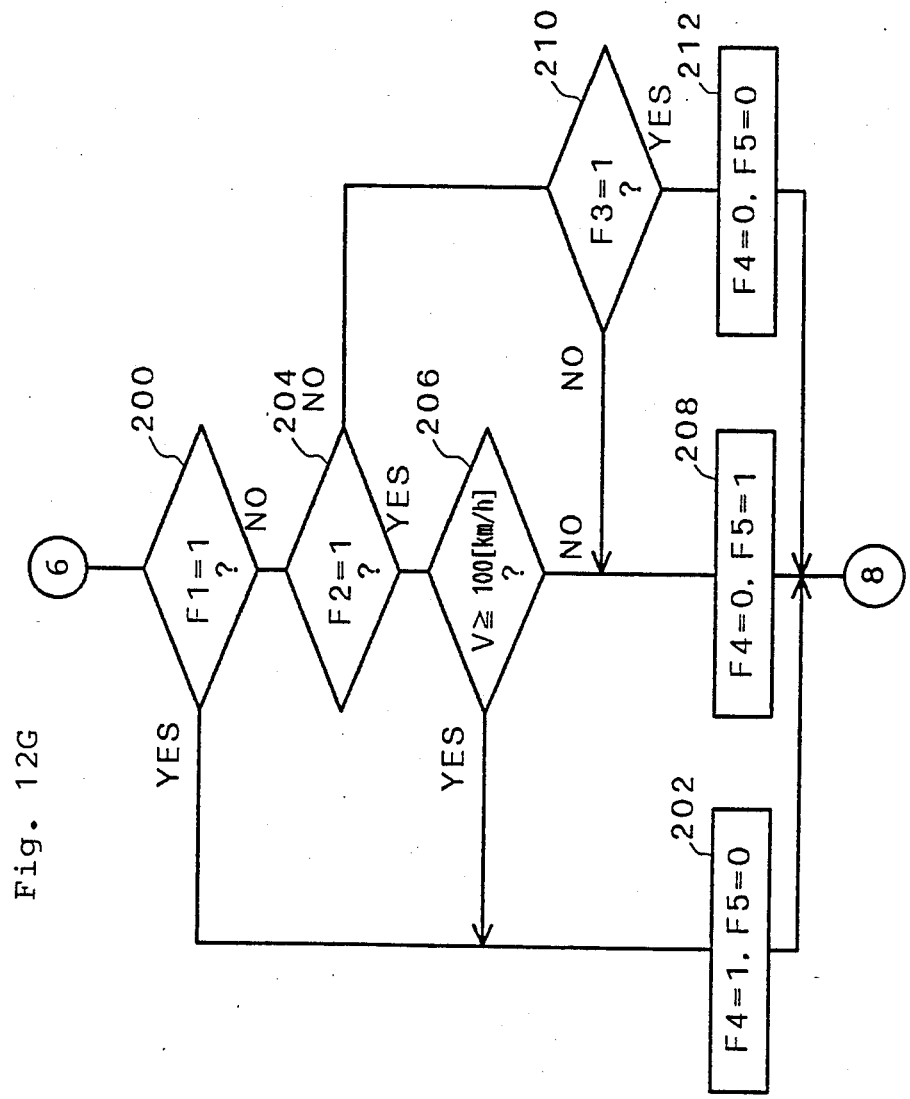
Figure 12I:
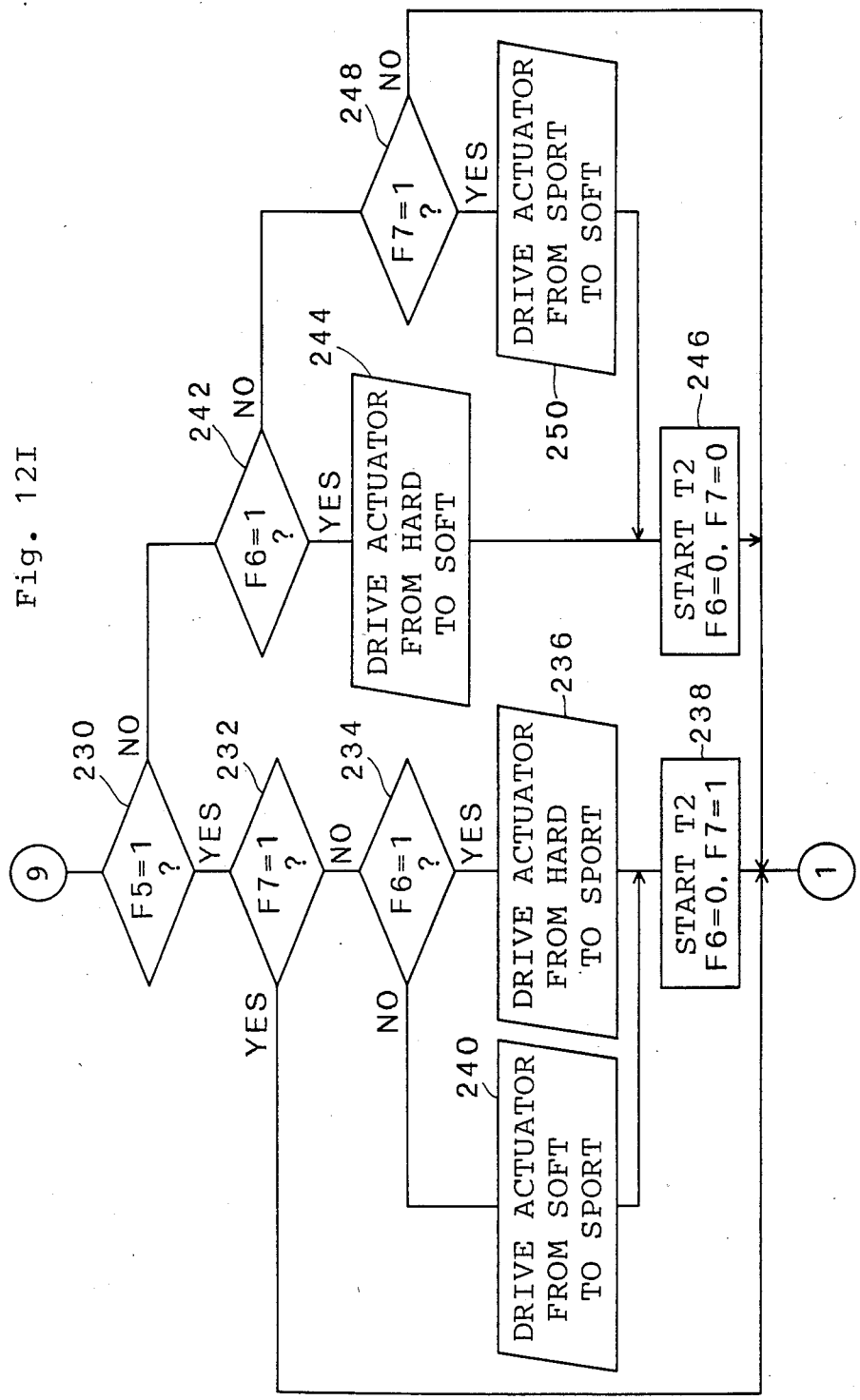

The program cycle then proceeds to the decision point 200 of FIG. 12G where it is determined if the flag F1 is equal to 1 and then to the decision point 204 where it is determined if the flag F2 is equal to 1. At the decision point 206, the vehicle speed V is compared with 100 Km/h. If V is equal to or greater than 100 Km/h, the flag F4 is set to 1 at step 202 so as to set the target suspension characteristic to the "HARD" state. On the contrary if V is less than 100 Km/h, the flag F5 is set to 1 at step 208 so as to set the target suspension characteristic to the "SPORT" state. When the target suspension characteristic is "HARD", as described above, the actuators A1L, A1R, A2L and A2R are activated to alter the suspension characteristic to "HARD" and the flag F6 is set to 1 at steps 214, 216, 218, 220, 222, 224, 252, 254 and 256 of FIG. 12H. On the other hand, when the target suspension characteristic is "SPORT", as described above, the actuators A1L, A1R, A2L and A2R are activated to alter the suspension characteristic to "SPORT" and the flag F7 is set to 1 at steps 214, 216, 230, 232, 252, 254 and 256 of FIG. 12H.

The program cycle then returns to steps 104, 106, 108 and 109 of FIG. 12A and steps 110 and 112 of FIG. 12B and proceeds to steps 170 and 172 of FIG. 12E where the vehicle height is detected at every predetermined time interval ts until the value in the counter C3 becomes equal to the number N2 of the detected vehicle height values. When C3 becomes equal to N2, the counter C3 is reset to zero at step 174 and the difference H2 between the maximum and minimum vehicle height converted values for the time period T2 is computed at step 176. The difference H2 is compared with the reference value HK3 at the decision point 178. If H2 is less than HK3, the value in the counter C5 is increased by one at step 180. The computation of H2 and the comparison between H2 and HK3 are executed three times successively at steps 182 and 184 of FIG. 12E and step 186 of FIG. 12F. When the value in the counter C5 becomes 3, (i.e., when the difference H2 is determined three times successively to be less than the reference value HK3), it is judged that the vehicle is now not running on the continuously rough road but on a flat surface of the road. Thus, the flag F2 is reset to zero so as to conclude the vibration control (steps 188, 190 and 192). The program cycle then proceeds to the decision points 200, 204 and 210 of FIG. 12G. When the shock control is not being executed, at the decision point 210, it is determined that the flag F3 is not equal to 1, and the program proceeds to step 208 where the flag F5 is set to 1 so as to set the target suspension characteristic to the "SPORT" state. The program cycle proceeds to steps 214 and 216 of FIG. 18H, and since the flag F5 is set to 1, then proceeds to step 230 of FIG. 12I. After steps 230, 232 and 234 have been executed, the program cycle proceeds to step 236 where the actuators A1L, A1R, A2L and A2R are activated to alter the suspension characteristic to "SPORT", and the proceeds to step 238 where the flag F7 is set to 1. After that, the program proceeds to steps 252, 254 and 256 where the actuators are stopped and the vibration control is concluded.

When neither the anti-dive control nor the vibration control is being executed, the shock control is executed. The vehicle height is detected at every time interval ts as the converted vehicle height HM, and the counter C1 is increased by one according to the detection of the vehicle height. These process steps are repeatedly executed until the value in the counter C1 becomes equal to the number n of the detected vehicle height values (steps 104, 106, 108 and 109 of FIG. 12A, steps 110 and 112 of FIG. 12B and steps 130 and 132 of FIG. 12C). When C1 becomes equal to n, the program cycle proceeds to step 134 to FIG. 12C where the counter C1 is reset to zero. At step 136, the difference h between the maximum converted vehicle height and the minimum converted vehicle height for the time period t is computed. The program then proceeds to the decison point 138 where the difference h is compared with the reference value HK1. If h is less than HK1, as described above, the suspension characteristic is retained in the "SPORT" state. If h is, however, greater than or equal to HK1, it is judged that the road surface has a large dip or bump. In this case, the program proceeds to the decision point 140 at which it is determined if the vehicle speed V is greater than or equal to 30 Km/h and is less than or equal to 80 Km/h. If the answer is yes and the vibration control described above is not being executed, the flag F3 is set to 1 and the timer T3 starts counting at step 144.

The program cycle proceeds to the decision points 200, 204 and 210 of FIG. 12G where the values in the flags F1, F2 and F3 are compared with 1. Since the flag F3 is equal to 1, the program proceeds to step 212 where the flags F4 and F5 are reset to zero so as to set the target suspension characteristic to "SOFT". The program passes through steps 214 and 216 of FIG. 12H and steps 230 and 242 of FIG. 12I and proceeds to the decision point 248 at which it is determined that the flag F7 is equal to 1. At step 250, the actuators A1L, A1R, A2L and A2R are activated to alter the suspension characteristic to "SOFT", and at step 246, the flags F6 and F7 are reset to zero. The program cycle then proceeds to steps 252, 254 and 256 of FIG. 12H where the actuators are stopped.

The program then returns to step 104 and passes through steps 106, 108 and 109 of FIG. 12A, steps 110 and 112 of FIG. 12B and steps 130, 132, 134, 136, 138, 146 and 148 of FIG. 12C. At these steps, the vehicle height is repeatedly detected, and when the above-mentioned difference h does not exceed the reference value HK1 and when the delay time interval td elapses, it is determined that the vehicle has already ridden over the bump or through the dip. The flag F3 is then reset to zero and the timer T3 is stopped from counting.

After that, at the decision points 200, 204 and 210, the values in the flags F1, F2 and F3 are compared with 1. Since all three flags are equal to zero, the program cycle proceeds to step 208 where the flag F5 is set to 1 so as to set the target suspension characteristic to "SPORT". In this case, as described above, the actuators A1L, A1R, A2L and A2R are activated to restore the suspension characteristic to "SPORT" and the flag F7 is set to 1 (steps 214 and 216 of FIG. 12H, steps 230, 232, 234, 240 and 238 of FIG. 12I and steps 252, 254 and 256 of FIG. 12H). The shock control is then concluded. This suspension control routine described above is repeatedly executed at every predetermined time interval.

In the suspension control routine of this embodiment, the anti-dive control is explained. This is, however, only an example and anti-roll control, anti-squat control and anti-shift-squat control can be executed in the same manner as the anti-dive control by setting or resetting flags for indicating the start and end conditions of each control.

Figure 13:
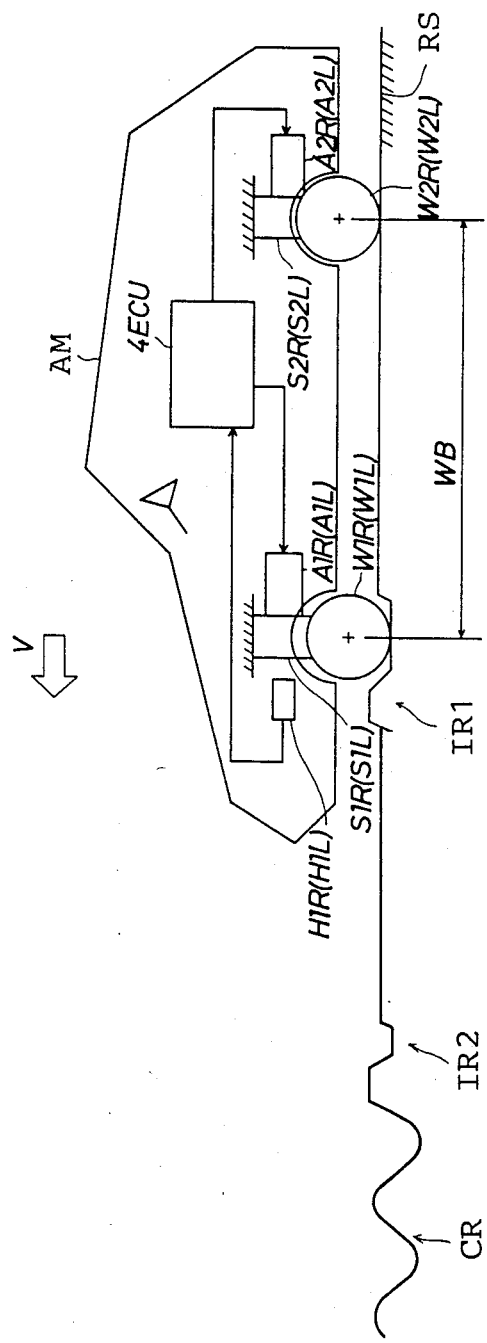
FIG. 13 is a schematic view illustrating that an automobile with the suspension controller of the embodiment moves on a road surface having dips and bumps.

One example of the control timing of this suspension control routine is described in accordance with FIGS. 13 and 14A, 14B, 14C, 14D and 14E. FIG. 13 illustrates that a front wheel W1R (or W1L) of an automobile AM is passing through a sporadic irregularity IR1 of a road surface RS while running at a speed V. FIGS. 14A, 14B, 14C, 14D and 14E are timing charts which respectively show the output of the front vehicle height sensor H1R (or H1L), the stop-lamp switch signal, driving current for the suspension characteristic alteration actuators (A1R, A1L, A2R and A2L), the change of the suspension characteristic and the change of the vehicle speed each against the elapsed time under the condition of FIG. 13.

In FIG. 14, t1 is a time point at which the front wheel W1R (or W1L) starts to pass through the irregularity IR1 after running on a flat part of the road surface RS as shown in FIG. 13. After the time point t1, the vehicle height detected from the front vehicle height sensor H1R (or H1L) fluctuates largely for a short time period. The vehicle height is detected at every time interval ts from the time point t1 and is converted into the converted vehicle height HM. At a time point t2 after the time interval t has elapsed since the time point t1, the converted value h of the maximum vehicle height change (6 in this embodiment) is compared with the reference value HK1 (5 in this embodiment) by the ECU 4. The converted value h is a difference between the maximum converted vehicle height (19 in this embodiment) and the minimum converted vehicle height (13 in this embodiment). Since h (6) is greater than HK1 (5), at the time point T2, the shock control is started. Namely, the ECU 4 outputs a control signal to the suspension characteristic alteration actuators A1R, A1L, A2R and A2L. As a result, the actuators A1R, A1L, A2R and A2L are activated to connect the main air chambers S1Ra, S1La, S2Ra and S2Ra and S2La of the air suspensions S1R, S1L, S2R and S2L with the auxiliary air chambers S1Rb, S1Lb, S2Rb and S2Lb thereof by means of large-diameter passages so as to lower the spring constants of the air springs, thus altering the suspension characteristic from "SPORT" to "SOFT". The alteration of the suspension characteristic is accomplished at a time point t3 after a time period Ta, required for altering the suspension characteristic, has enlapsed since the time point ts. The current for driving the actuators A1R, A1L, A2R and A2L is supplied until a time point t4 after a time period Tb has elapsed since the time point t2. Tb is a time period for driving the actuators for the alteration of the suspension characteristic. By executing the shock control, a shock to the vehicle body caused by the rear wheel W2R (or W2L) passing through the irregularity IR1 can be reduced. At a time point t5 after the delay time interval td for restoring the suspension characteristic has elapsed since the time point t2, the rear wheel W2R (or W2L) has also passed through the irregularity IR1 and again runs on the flat part of the road surface RS. For a time period between the time point t2 and the time point t5, the outputs of the front vehicle height sensor H1R (or H1L) scarcely fluctuate. Thus, at the time point t5, the ECU 4 outputs a control signal to the suspension characteristic alteration actuators A1R, A1L, A2R and A2L. As a result, the actuators A1R, A1L, A2R and A2L are activated to connect the main air chambers S1Ra, S1La, S2Ra and S2La of the air suspensions S1R, S1L, 2SR and S2L with the auxiliary air chambers S1Rb, S1Lb, S2Rb and S2Lb thereof by means of small-diameter passages so as to restore the spring constants of the air springs, thus restoring the suspension characteristic from "SOFT" to "SPORT" for cruising. The alteration of the suspension characteristic is accomplished at a time point t6 after the time period Ta has elapsed since the time point t5. The current for driving the actuators A1R, A1L, A2R and A2L is supplied until a time point t7 after the time period Tb has elapsed since the time point t5.

At a time point t8, the front wheel W1R (or W1L) of the automobile AM starts to pass through another sporadic irregularity IR2 of the road surface RS. At a time point t9 after the time interval t has elapsed since the time point t8, the converted value h of the maximum vehicle height change (5 in this embodiment) is compared with the reference value HK1 (5 in this embodiment) by the ECU 4. The converted value h is a difference between the maximum converted vehicle height (18 in this embodiment) and the minimum value (13 in this embodiment). Since h is equal to HK1, at the time point t9, the shock control is again started. Namely, at a time point t10 after the time period Ta has elapsed since the time point t9, the suspension characteristic is altered from "SPORT" to "SOFT" in the same manner as described above. The current for driving the actuators is supplied until a time point t11.

At a time point t12, the front wheel W1R (or W1L) of the automobile AM starts to move on a continuously rough road CR. At a time point t13 after the vibration judgment time period T1 has elapsed since the time point t12, the converted value H1 of the maximum vehicle height change (11 in this embodiment) is compared with the reference value HK2 (11 in this embodiment) by the ECU 4. The converted value H1 is a difference between the maximum converted vehicle height (21 in this embodiment) and the minimum value (10 in this embodiment). Since H1 is equal to HK2, at the time point t13, the vibration control is started with priority to the shock control which has already started. Namely, at the time point t13, the ECU 4 outputs a control signal to the suspension characteristic alteration actuators A1R, A1L, A2R and A2L. As a result, the actuators A1R, A1L, A2R and A2L are activated in the same manner as described above so as to alter the suspension characteristic from "SOFT" to "SPORT" for cruising. The alteration of the suspension characteristic is accomplished at a time point t14 after the time period Ta has elapsed since the time point t13. The current for driving the actuators A1R, A1L, A2R and A2L is supplied until a time point t15 after the time period Tb has elapsed since the time point t13. The maximum vehicle height change value H2 for a time period between the time points t13 and t16, the maximum value H3 for a time period between t16 and t18 and the maximum value H4 for a time period between t18 and t19 are all greater than or equal to the reference value HK3. Because of this, it is judged that the vibration remains and that the vehicle is still moving on the continuously rough road, thus the suspension characteristic is not restored. Here, t16, t18 and t19 respectively show a time point after the restoration judgment time period T2 has elapsed since the time point t13, t16 and t18. Although the maximum value h, for a time period between t16 and t17 after t has elapsed since t16, is greater than or equal to the reference value HK1, since the vibration control is executed with priority to the shock control, the suspension characteristic is not altered at the time point t17 but remains in "SPORT".

While the automobile AM is moving on the continuously rough road CR, at a time point t20 the driver applies the brake to reduce the vehicle speed so that the stop-lamp switch is turned "ON". Since the vehicle speed is 70 Km/h at the time point t20, the anti-dive control (one of the attitude control) is started with priority to the vibration control. Namely, at the time point t20, the ECU 4 outputs a control signal to the suspension characteristic alteration actuators A1R, A1L, A2R and A2L. As a result, the actuators A1R, A1L, A2R and A2L are activated in the same manner as described above so as to alter the suspension characteristic from "SPORT" to "HARD". The alteration of the suspension characteristic is accomplished at a time point t21 after the time period Ta has elapsed since the time point t20. The current for driving the actuators A1R, A1L, A2R and A2L is supplied until a time point t22 after the time period Tb has elapsed since the time point t20. Since the suspension characteristic is altered to the hardest state, the dive of the vehicle body is reduced. At a time point t23, the driver stops the braking action so that the stop-lamp switch is turned "OFF". At a time point t24 after the time period tc has elapsed since the time point t23, the ECU 4 ouputs a control signal to the suspension characteristic alteration actuators A1R, A1L, A2R and A2L. As a result, the actuators A1R, A1L, A2R and A2L are activated in the same manner as described above so as to restore the suspension characteristic from "HARD" to "SPORT". The alteration of the suspension characteristic is accomplished at a time point t25 after the time period Ta has elapsed since the time point t24. The current for driving the actuators A1R, A1L, A2R and A2L is supplied until a time point t26 after the time period Tb has elapsed since the time point t24, when the attitude control is concluded.

In case that the vibration control continues from the time point t13, the maximum vehicle height change value H5 for a time period between the time points t27 and t28, the maximum change value H6 for a time period between t28 and t29 and the maximum change value H7 for a time period between t29 and t30 are all less than the reference value HK3. Because of this, at the time point t30, it is judged that the vibration has subsided and that the vehicle has passed through the continuously rough road and now is running on a plain road surface, thus the vibration control is concluded and the suspension characteristic is retained in "SPORT" for cruising.

As described above in detail, the vibration control is executed with priority to the shock control and the attitude control with priority to the vibration control.

In this embodiment, the right front vehicle height sensor H1R, the left front vehicle height sensor H1L, the stop-lamp switch SE1, the throttle position sensor SE3, the steering sensor SE4, the speed sensor SE5, the ECU 4 and the process steps 108 and 109 executed by the ECU 4 function as the vehicle attitude detection means M1. The right front air suspension S1R, the left front air suspension S1L, the right rear air suspension S2R, the left rear air suspension S2L, the suspension characteristic alteration actuators A1R, A1L, A2R and A2L, the ECU 4 function as the suspension characteristic alteration means M2. The ECU 4 and the process steps 112, 114, 116, 120, 122, 124, 126, 128, 130, 132, 134, 136, 138, 140, 144, 146, 148, 152, 154, 156, 158, 160, 162, 164, 170, 172, 174, 176, 178, 180, 182, 184, 186, 188, 190, 192, 194, 202, 206, 208, 212, 214, 216, 218, 220, 222, 224, 226, 230, 232, 234, 236, 238, 240, 242, 244, 246, 248, 250, 252, 254 and 256 executed by the ECU 4 function as the control means M3. The ECU 4 and the process steps 118, 142, 150, 200, 204 and 210 executed by the ECU 4 function as the preference means M4.

As described above in detail, in this embodiment, the control means M3 includes three different control sections, i.e., the shock control section, the vibration control section and the attitude control section. In the shock control, when the converted value h of the maximum vehicle height change for the shock judgment time period t is greater than or equal to the reference value HK1, the suspension characteristic is altered to "SOFT". Here, the converted value h is computed based on the vehicle height detected by the front vehicle height sensor H1R (or H1L) at every time interval ts. In the vibration control, when the converted value H1 of the maximum vehicle height change for the vibration judgment time period T1 is greater than or equal to the reference value HK2, the suspension characteristic is altered to "SPORT" or to "HARD" in response to the vehicle speed. In the attitude control, when the driving condition detected from the neutral-start switch SE1, the stop-lamp switch SE2, the throttle position sensor SE3, the steering sensor SE4 and the speed sensor SE5 satisfies a predetermined condition, the suspension characteristic is altered to "HARD". In these controls, the vibration control is executed with priority to the shock control and the attitude control with priority to the vibration control. As a result, even when the vehicle runs on the continuously rough road, the suspension characteristic is altered to "HARD" by executing the attitude control preferentially so as to reduce the squat or dive of the vehicle body caused by abrupt starting, braking or acceleration of the vehicle, and the rolling of the body caused by the large steering deviation. Thus, the abrupt change of the vehicle attitude can be prevented so that good control and high stability of the vehicle can be maintained.

When the vehicle runs on the continuously rough road under the driving condition which does not cause the abrupt change of the vehicle attitude, the vibration control is executed preferentially and the suspension characteristic is altered to "SPORT" or to "HARD" in response to the vehicle speed so as to reduce the vibration having the cycle time near the resonant vibration of sprung mass (1.2 to 1.3 (Hz)). As a result, for example, the pitching or the bouncing of the vehicle can be quickly stopped so as to improve the riding comfort and to keep good control and high stability. In the vibration control, the vibration judgment time period T1 is different from the restoration judgment time period T2, and the reference value HK2 for judging a vibration differs from the reference value HK3 for judging the restoration. Namely, the vibration control is started when a vibration having a large amplitude and a short cycle time is detected, and is stopped when a vibration having a small amplitude and a long cycle time is detected. Thus, the hunting caused by this control can be prevented and moreover the control for damping the vibration of the vehicle body can be continuously executed while running on the continuously rough road.

When the vehicle rides over a sporadic bump or through a sporadic dip in the road surface under the condition which does not cause the abrupt change of the vehicle attitude, the shock control is executed and the suspension characteristic is altered to "SOFT" so as to reduce the shock to the vehicle body, thus improving the riding comfort. In the shock control, the altered suspension characteristic is restored to "SPORT" after the delay time interval td has elapsed. If, however, the vehicle height change greater than the reference value HK1 is detected again before the delay time interval td elapses, the interval td is recounted from that time point. Thus, the unnecessary alteration of the suspension characteristic, (e.g., that the suspension characteristic is again altered from "SOFT" to "SPORT" immediately after switching from "SPORT" to "SOFT"), can be prevented. As a result, reliability and durability of the actuators A1R, A1L, A2R and A2L and the air suspensions S1R, S1L, S2R and S2L are remarkably improved. Furthermore, since the suspension characteristic is retained in "SOFT" for a time period necessary for damping the vibration, good control and high stability can be maintained.

Examples of suspension characteristic alteration means apart from any air suspensions are described below.

Figure 15A:
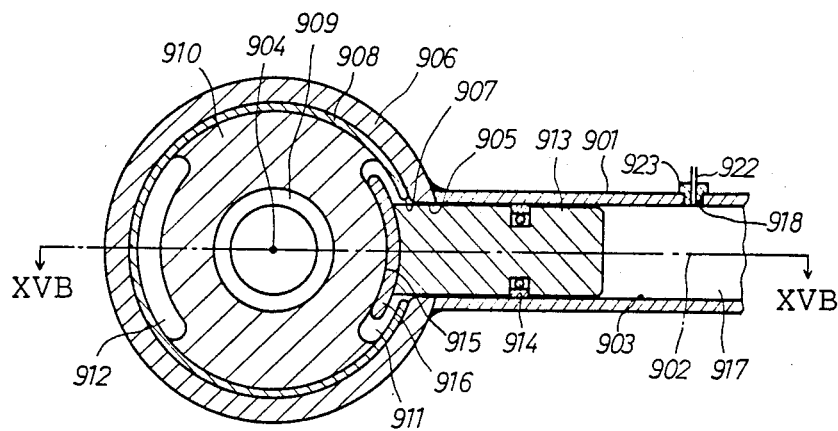
FIG. 15A is a sectional view of a rubber bush as a first example.
Figure 15B:
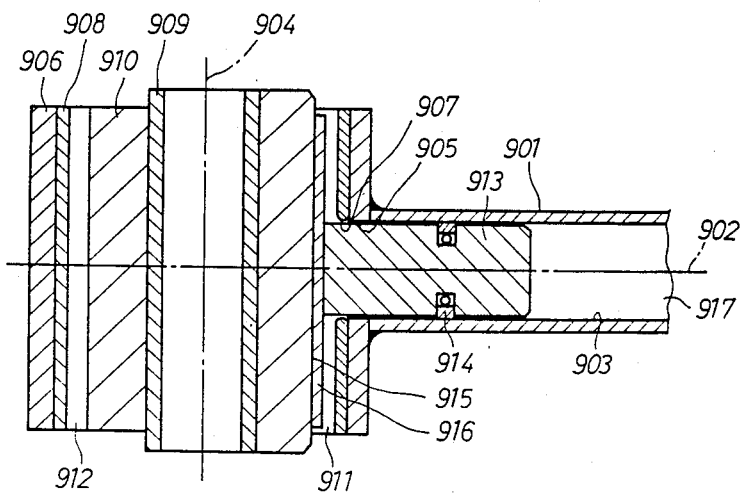
FIG. 15B is a sectional view taken on line XVB—XVB of FIG. 15A.

The first example is a bush for joining suspension bars such as the upper and lower control arms of a suspension, as shown in FIGS. 15A and 15B. The stiffness of the bush can be changed so as to alter the characteristic of the suspension. The spring constant and damping force of the bush are varied accompanied with changes of the bush stiffness.

FIG. 15A shows a sectional view of the joint of the suspension bar. FIG. 15B shows a sectional view taken on line XVB—XVB of FIG. 15A. In the drawings, numeral 901 designates a control arm extending along an axis 902 and having a hole 903. A sleeve 906, which extends along an axis 904 perpendicular to the axis 902 and which has a hole 905, is welded around the hole 905 at one end of the control arm 901. An outer cylinder 908 having a hole 907 is press-fitted in the sleeve 906. An inner cylinder 909 is provided in the outer cylinder 908 concentrically thereto. A bush 910 made of vibration-proof rubber is interposed between the outer cylinder 908 and the inner cylinder 909. The bush 910 and the outer cylinder 908 define arc-shaped openings 911 and 912 which are located to be opposed to each other along the axis 904, thus the stiffness in the direction of the axis 902 is set at a relatively low value. The hole 903 of the control arm 901 constitutes a cylinder which supports a piston 913 for movement back and forth along the axis 902. A sealing member 914 is tightly packed in between the piston 913 and the inside surface of the hole 903. A contact plate 916 is secured at one end of the piston 913. The contact plate 916 curves about and extends along the axis 904, thus being brought into contact with the inside surface 915 of the opening 911.

The other end of the control arm 901 is constructed the same as shown in FIGS. 15A and 15B. A cylinder chamber 917 is defined between the piston 913 and another piston (not shown in the drawings) and is fitted with the other end of the control arm 901. The cylinder chamber 917 is connected with the exterior through a tapped hole 918 provided in the control arm 901. A nipple 923, fixed on one end 922 of a conduit connected to an oil pressure source (not shown in the drawings), is secured in the tapped hole 918 to apply oil pressure to the cylinder chamber 917.

When the oil pressure in the cylinder chamber 917 is relatively low, the force pushing the piston 913 leftward in the drawings is so weak that the piston is held in such a position (shown in the drawings) that the contact plate 916 is brought into light contact with the inner surface 915 of the bush 910. As a result, the stiffness of the bush 910 in the direction of the axis 902 is made relatively low. When the oil pressure in the cylinder chamber 917 is relatively high, the piston 913 is driven leftward in the drawings and the contact plate 916 pushes the inner surface 915 of the bush 910 so that the portion of the bush between the contact plate and the inner cylinder 909 is compressed. As a result, the stiffness of the bush 910 in the direction of the axis 902 is raised.

If the suspension bar is provided between the body and the wheel of a vehicle, the characteristic of the suspension for the rear wheel can be altered by controlling the oil pressure in the cylinder chamber 917 through the action of an actuator such as a pressure control valve. When the oil pressure is raised by an instruction from the ECU 4, the stiffness of the bush 910 is enhanced to increase the damping force and spring constant of the suspension. Thus, the suspension characteristic is altered to 'HARD' state so as to improve the controllability and stability of the vehicle. When the oil pressure is lowered, the damping force for the rear part of the vehicle is reduced.

Figure 16A:
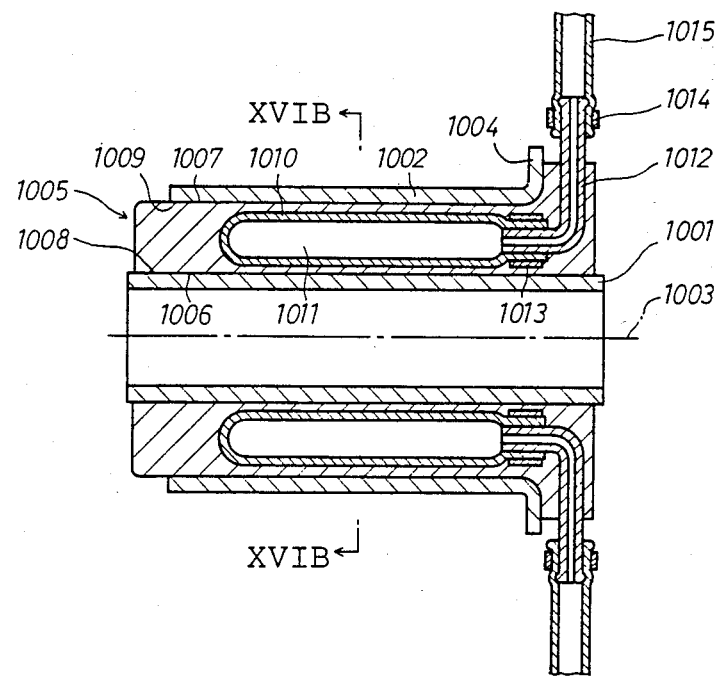
FIG. 16A is a sectional view of another rubber bush as a second example.
Figure 16B:
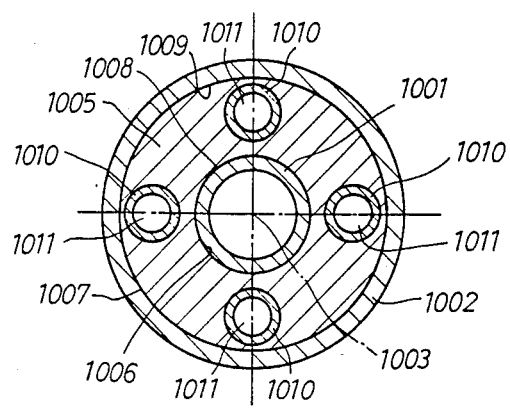
FIG. 16B is a sectional view taken on line XVIB—XVIB of FIG. 16A.

The second example is another bush which is shown in FIGS. 16A and 16B and which have the same function as the former.

FIG. 16A shows a sectional view of the bush integrally constructed with inner and outer cylinders as a bush assembly. FIG. 16B shows a sectional view taken on line XVIB—XVIB of FIG. 16A. In the drawings, four expansible and compressible hollow bags 1010, which extend along an axis 1003 and which are separately located in equiangular positions around the axis, are embedded in a bush 1005. The hollow bags 1010 define four chambers 1011 extending along the axis 1003 and being separately located at equiangular positions around the axis. Each hollow bag 1010 is secured at one end on one end of a coupler 1012, embedded in the bush 1005 by a clamp 1013, so as to connect the chambers 1011 with the exterior by means of the coupler 1012. One end of a hose 1015 is fixedly connected to the other end of the coupler 1012 by a clamp 1014, and the other end of the hose 1015 is connected to a compressed air source by means of an actuator such as a pressure control valve (not shown in the drawings). The controlled air pressure can be introduced into each chamber 1011. When the actuator is put in operation by the ECU 4, the air pressure in each chamber 1011 can be varied to change the stiffness of the bush in a stepless manner. The stiffness of the bush can thus be appropriately altered to be high (HARD) or low (SOFT) after a shock at the front wheels is detected.

FIGS. 17A–17G show a construction of a stabilizer as the third example.

Figure 17A:
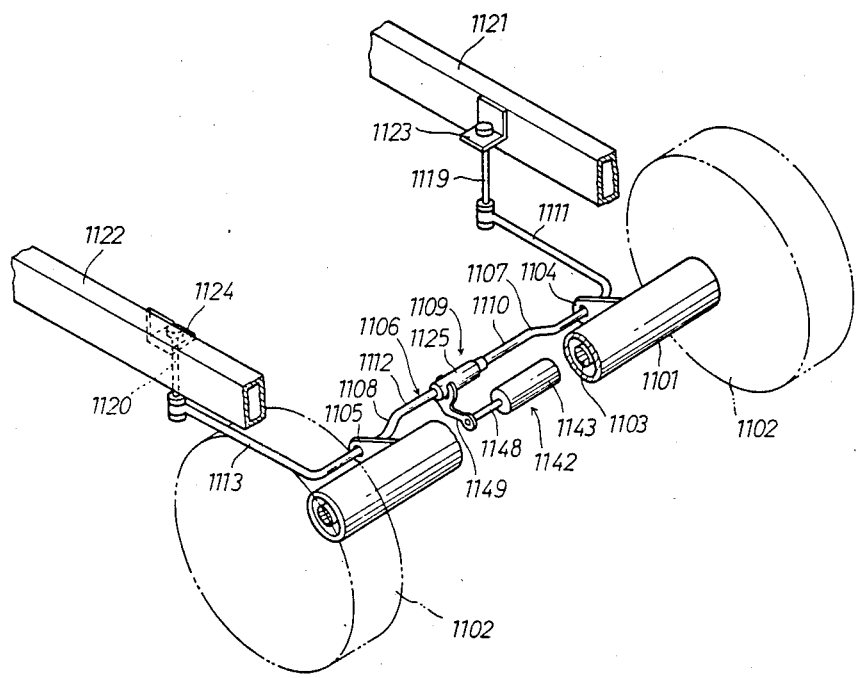
FIG. 17A is a perspective view of a stabilizer as a third example in use.
Figure 17B:
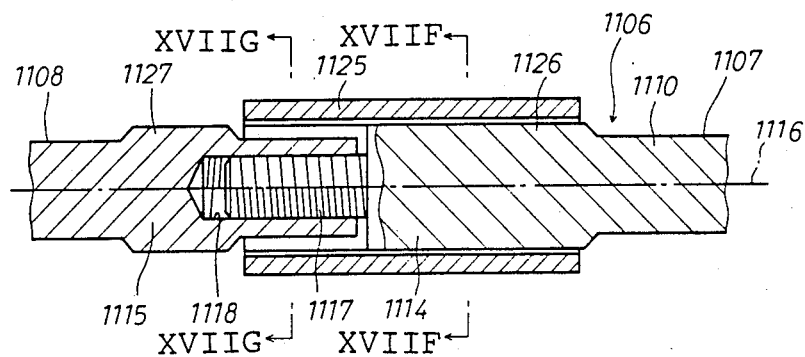
FIGS. 17B and 17C are enlarged sectional views each showing a part of the third example of FIG. 17A.
Figure 17C:
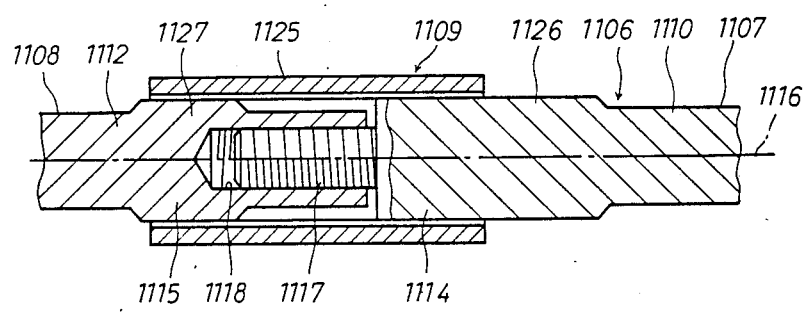
Figure 17D:
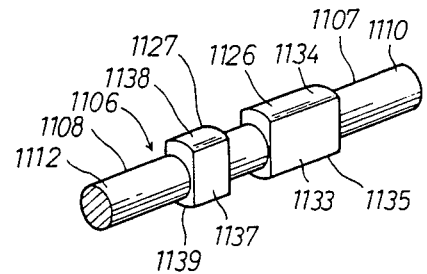
FIG. 17D is a perspective view of the main part of the third example of FIG. 17A.
Figure 17E:
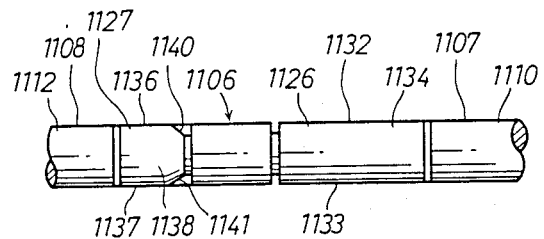
FIG. 17E is a plan view of FIG. 17D.
Figure 17F:
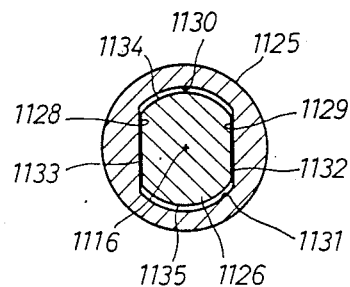
FIG. 17F is a sectional view taken on line XVIIF—XVIIF of FIG. 17B.
Figure 17G:
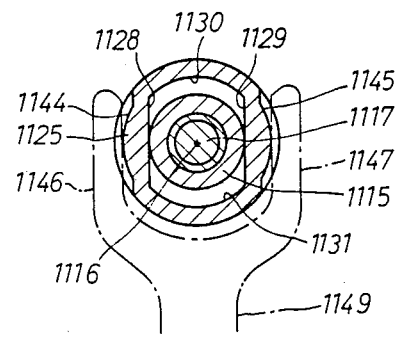
FIG. 17G is a sectional view taken on line XVIIG—XVIIG of FIG. 17B.

FIG. 17A shows a exploded perspective view of a torsion-bar-type stabilizer built in an axle-type suspension of an automobile. FIGS. 17B and 17C respectively show enlarged partial sectional views of the main part of the stabilizer of FIG. 17A in the coupled and uncoupled states. FIG. 17D shows a perspective view of the main part shown in FIGS. 17B and 17C, omitting the clutch. FIG. 17E shows a plan view of the main part shown in FIG. 17D. FIG. 17F shows a cross-sectional view taken on line XVIIF—XVIIF of FIG. 17B. FIG. 17G shows a cross-sectional view taken on line XVIIG—XVIIG of FIG. 17B.

In the drawings, an axle 1103 coupled with wheels 1102 is rotatably supported by an axle housing 1101. A pair of brackets 1104 and 1105 is secured on the axle housing 1101 in positions separated from each other in the direction of the width of the body. A torsion-bar-type stabilizer 1106 is coupled to the axle housing 1101 by means of bushes (not shown in the drawings) by the brackets 1104 and 1105.

The stabilizer 1106 includes a right portion 1107 and a left portion 1108 which can be seletively coupled to each other by a coupling unit 1109. A protrusion 1117 and a hole 1118, which extend along an axis 1116, are respectively formed at the ends 1114 and 1115 of rods 1110 and 1112 opposite the arms 1111 and 1113, as shown in FIG. 17B. The protrusion 1117 and the hole 1118 are respectively constructed as a male screw and a female screw which are engaged with each other so as to couple the rods 1110 and 1112 rotatably relative to each other around the axis 1116. The tips of the arms 1111 and 1113 are coupled to brackets 1123 and 1124, secured on side frames 1121 and 1122 of the vehicle by links 1119 and 1120. As shown in FIG. 17C, the coupling unit 1109 includes a cylindrical clutch 1125, a clutch guide 1126 and a clutch bearer 1127. The clutch guide 1126 is provided at one end 1114 of the rod 1110 and supports the clutch 1125 non-rotatably around the axis 1116 but permitting movement back and forth along the axis. The clutch bearer 1127 is provided at the end 1115 of the rod 1112 and bears the clutch 1125 non-rotatably around the axis 1116. The inside circumferential surface of the clutch 1125 includes planes 1128 and 1129 facing each other relative to the axis 1116 and extending in parallel with each other along the axis, and partially cylindrical surfaces 1130 and 1131 adjoining the planes in position opposed to each other relative to the axis 1116, as shown in FIG. 17F. Corresponding to the inside circumferential surface of the clutch 1125, the peripheral surface of the clutch guide 1126 includes planes 1132 and 1133 facing each other relative to the axis 1116 and extending in parallel with each other along the axis, and partially cylindrical surfaces 1134 and 1135 adjoining the planes in positions opposed to each other relative to the axis 1116. The peripheral surface of the clutch bearer 1127 includes planes 1136 and 1137 facing each other relative to the axis 1116 and extending in parallel with each other along the axis, and partially cylindrical surfaces 1138 and 1139 adjoining the planes in positions opposed to each other relative to the axis 1116, as shown in FIG. 17D or FIG. 17E.

The plane 1132 and 1133 of the clutch guide 1126 are always engaged with those 1128 and 1129 of the clutch 1125 as shown in FIG. 17F. When the clutch 1125 is in a position shown in FIG. 17C, planes 1136 and 1137 of the clutch bearer 1127 are also engaged with those 1128 and 1129 so that the right portion 1107 and the left portion 1108 of the stabilizer are integrally coupled to each other so as not to rotate along the axis 1116. As shown in FIG. 17E, the ends 1140 and 1141 of the planes 1136 and 1137 of the cluth bearer 1127 at the right portion 1107 of the stabilizer are chamfered. Even if the rods 1110 and 1112 are slightly rotated to each other around the axis 1116, the clutch 1125 can be moved from a position shown in FIG. 17B to a position shown in FIG. 17C. The right portion 1107 of the stabilizer is thus integrally coupled to the left portion 1108 thereof as the arms 1111 and 1113 of the portions are on the same plane.

The clutch 1125 is moved back and forth along the axis 1116 by an actuator 1142 controlled by the ECU 4. The actuator 1142 shown in FIG. 17A includes a hydraulic pistoncylinder unit 1143 secured on a differential casing (not shown in the drawings), and a shifting fork 1149. The fork 1149 has arms 1146 and 1147 engaged in grooves 1144 and 1145 of the peripheral surface of the clutch 1125, as shown in FIG. 17G, and is coupled to the piston rod 1148 of the piston-cylinder unit 1143 shown in FIG. 17A.

When the clutch 1125 is placed in a position shown in FIG. 17C by the actuator 1142 according to an instruction from the ECU 4, the right portion 1107 and left portion 1108 of the stabilizer 1106 are integrally coupled to each other to reduce the rolling of the vehicle, thus improving its controllability and stability. On the other hand, when the clutch 1125 is placed in a position shown in FIG. 17B by the actuator 1142, the right portion 1107 and left portion 1108 of the stabilizer 1106 can be rotated relative to each other around the axis 1116 to reduce the shock to the vehicle, and more particularly to reduce the shock to the wheels of only one side of the vehicle, thus improving the riding comfort of the vehicle.

Figure 18A:
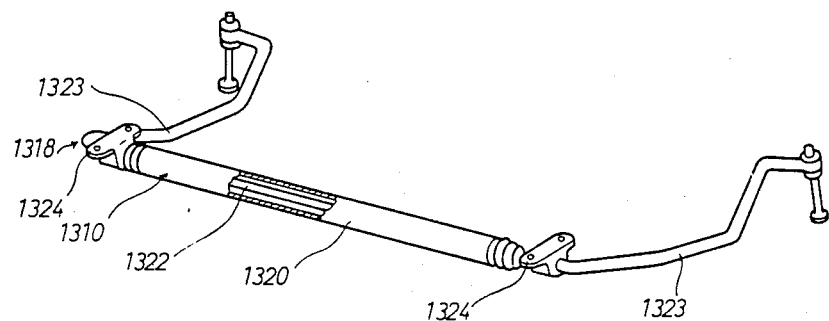
FIG. 18A is a perspective view of another stabilizer as a fourth example.
Figure 18B:
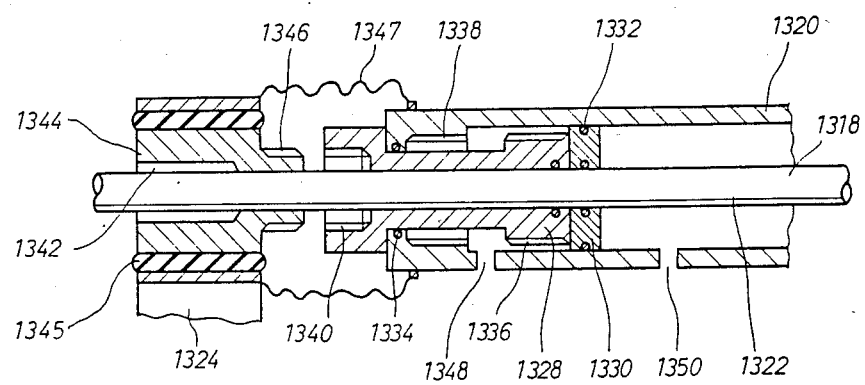
FIG. 18B is an enlarged sectional view showing a part of the fourth example of FIG. 18A.

FIGS. 18A and 18B show another stabilizer as the fourth example.

A stabilizer-bar-type assembly 1310 includes a first stabilizer bar 1318 and a second stabilizer bar 1320, as shown in FIG. 16A. The first stabilizer bar 1318 includes a main portion 1322 and an arm 1323. The main portion 1322 is attached to the body of a vehicle by a pair of fitting metals 1324 so that the main portion 1322 can be twisted around its axis.

The second stabilizer bar 1320 is hollow so that the main portion 1322 of the first stabilizer bar 1318 extends through the second stabilizer bar, as shown in FIG. 18B. The second stabilizer bar 1320 is disposed inside the pair of fitting metals 1324 so that the first stabilizer bar 1318 can be connected to and disconnected from the second stabilizer. A piston 1330, on which a spool 1328 is secured, is slidably fixed inside one end of the second stabilizer bar 1320 in such a manner that the piston is liquid-tightly sealed by a sealing member 1332. The spool 1328 is liquid-tightly sealed by a sealing member 1334, and projects out of the second stabilizer bar 1320. The spool 1328 has splines 1336 near the pistons 1330, while the second stabilizer bar 1320 has, at one end, splines 1338 which can be engaged with the splines 1336. The spool 1328 has other splines 1340 inside the outwardly projecting end thereof.

A coupler 1344 is connected to the main portion 1322 of the first stabilizer bar 1318 by splines 1342. The coupler 1344 has splines 1346 engageable with the splines 1340, which extend from the spool 1328 and which are opposed thereto. The coupler 1344 is connected to the fitting metals 1324 by means of a rubber bush 1345, as shown in FIG. 18B, so that the main portion 1322 of the first stabilizer bar 1318 is twisted by deforming the bush 1345. The coupler 1344 is fitted in such a position that the spines 1340 are engaged with the splines 1346 when the spool 1328 is moved leftward in the drawing, and the splines 1336 are engaged with the splines 1338. A bellowslike boot 1347 for protecting the splines 1340 and 1346 from dust is provided between the coupler 1344 and the second stabilizer bar 1320.

Two ports 1348 and 1350 are provided in the second stabilizer bar 1320 in such a manner that the piston 1330 is located between the ports. Piping is provided to lead a pressure fluid to the ports 1348 and 1350 in use. When the pressure fluid is led to one port 1350 via an actuator such as a pressure control valve, the piston 1330 is moved leftward in the drawing, together with the spool 1328. The splines 1336 are engaged with the splines 1338, and the splines 1340 with the splines 1346. As a result, the first and second stabilizer bars 1318 and 1320 are coupled to each other so as to raise the stiffness of the stabilizer bar assembly. On the contrary, when the pressure fluid is led to the other port 1348, the piston 1330 is moved rightward in the drawing, thus the splines are disengaged from each other. As a result, the stiffness of the stabilizer bar assembly is reduced.

Figure 19A:
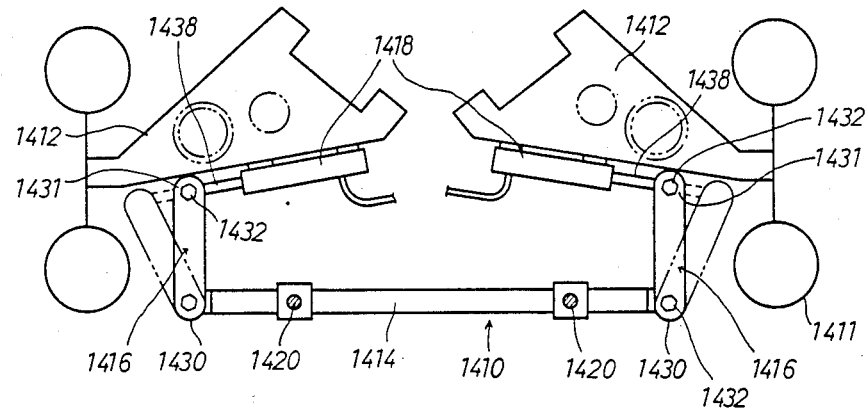
FIG. 19A is a schematic plan view of another stabilizer as a fifth example.
Figure 19B:
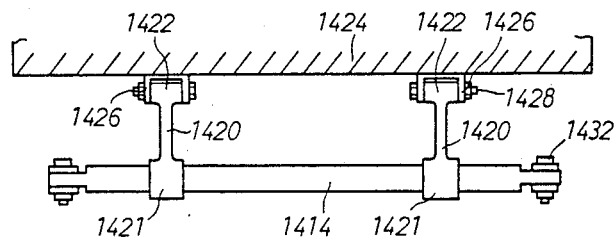
FIG. 19B is an explanatory view showing a part of FIG. 19A.
Figure 19C:
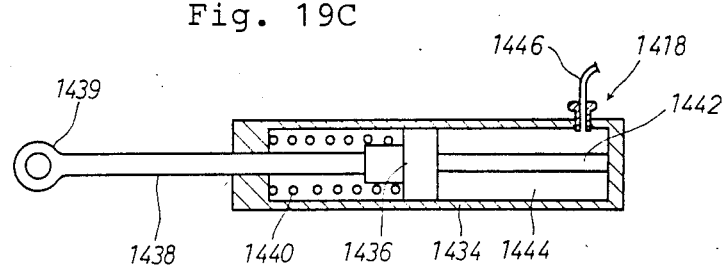
FIG. 19C is a sectional view of the extending part of FIG. 19A.

FIGS. 19A, 19B and 19C show three different views of still another stabilizer as the fifth example.

FIG. 19A shows a schematic plan view of a stabilizer 1410. In the drawing, numeral 1411 denotes wheels and numeral 1412 denotes suspension arms. The stabilizer 1410 includes a main part 1414, a pair of arms 1416 and extending parts 1418. The main part 1414 in the form of a round bar is laid through bearing portions 1421 of a pair of links 1420 disposed at certain distances apart from each other in the direction of the width of the body 1424 of a vehicle, and is supported by the bearing portions 1421 so that the main part 1414 can be twisted around its axis. The other bearing portions 1422 at the upper ends of the links 1420 are rotatably supported by pins 1428 extending through brackets 1426 welded on the vehicle body 1424. As a result, the main part 1414 is disposed along the width of the vehicle body, and can be twisted relative to the vehicle body.

The pair of arms 1416 are made of flat bars. The first ends 1430 of the arms 1416 are coupled to the ends of the main part 1414 by bolts and nuts 1432 so that the arms can be rotated around vertical axes. The second ends 1431 of the arms 1416 are located at certain distances away from the first ends 1430 to the front-to-rear direction of the vehicle body 1424. The front-to-rear direction is an oblique longitudinal direction.

The second ends 1431 of the arms 1416 are displaced in the direction of the width of the vehicle body 1424 by the extending parts 1418 which may be power cylinders. Each of the power cylinders shown in FIG. 19C includes a cylinder 1434, a piston 1436 liquid-tightly and slidably fitted in the cylinder 1434, a piston rod 1438, which is coupled at one end to the piston 1436 and which projects at the other end out of the cylinder 1434, and a compressed spring 1440 for displacing the piston 1436 in such a direction as to contract the piston rod 1438. A stopper 1442 secured on the piston 1436 prevents the piston from being displaced more than a predetermined distance.

The cylinder 1434 is secured on the suspension arm 1412 in such a manner that the piston rod 1438 is located outside the cylinder 1434 in the direction of the width of the vehicle body. The second end 1431 of the arm 1416 is coupled to the outwardly projecting end 1439 of the piston rod 1438 by the bolts and nuts 1432 so that the arm 1416 can be rotated around the vertical axis.

One end of a flexible hose 1446 is connected to a liquid chamber 1444 of the cylinder 1434 opposite the side on which the compressed spring 1440 is located. The other end of the flexible hose 1446 is connected to a pressure source (not shown in the drawings) through an actuator such as a pressure control valve. Unless pressure is applied to the liquid chambers 1444 of the power cylinders according to the state of the actuator instructed by the ECU 4, the second ends 1431 of the arms 1416 are located in relatively inner positions as shown in FIG. 19A, so that the anti-roll rate of the stabilizer is low.

On the contrary, when the actuator is operated by the ECU 4 to apply pressure to the liquid chambers 1444 of the power cylinders, the pressure acts to the pistons 1436 to push out the piston rods 1438 against the compressed springs 1440. As a result, the second ends 1431 of the arms 1416 are pushed out as indicated by imaginary lines, i.e., double dotted chain lines, in FIG. 19A, to increase the arm ratio of the stabilizer to raise its stiffness against the rolling of the vehicle.

Figure 20A:
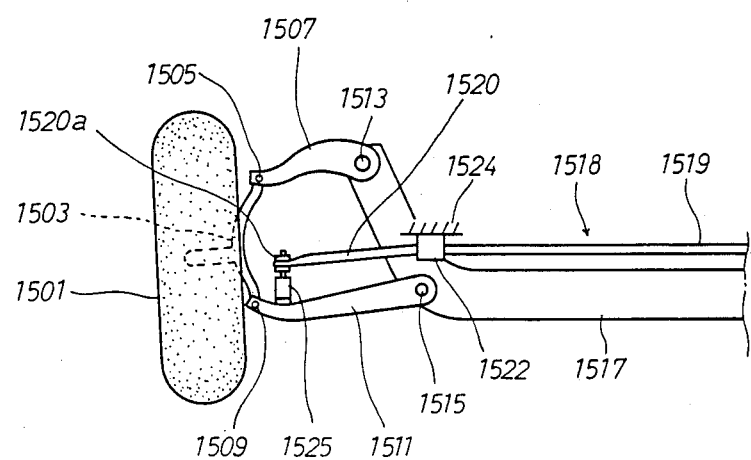
FIG. 20A is a front view showing a part of a stabilizer and a joint as a sixth example in use.
Figure 20B:
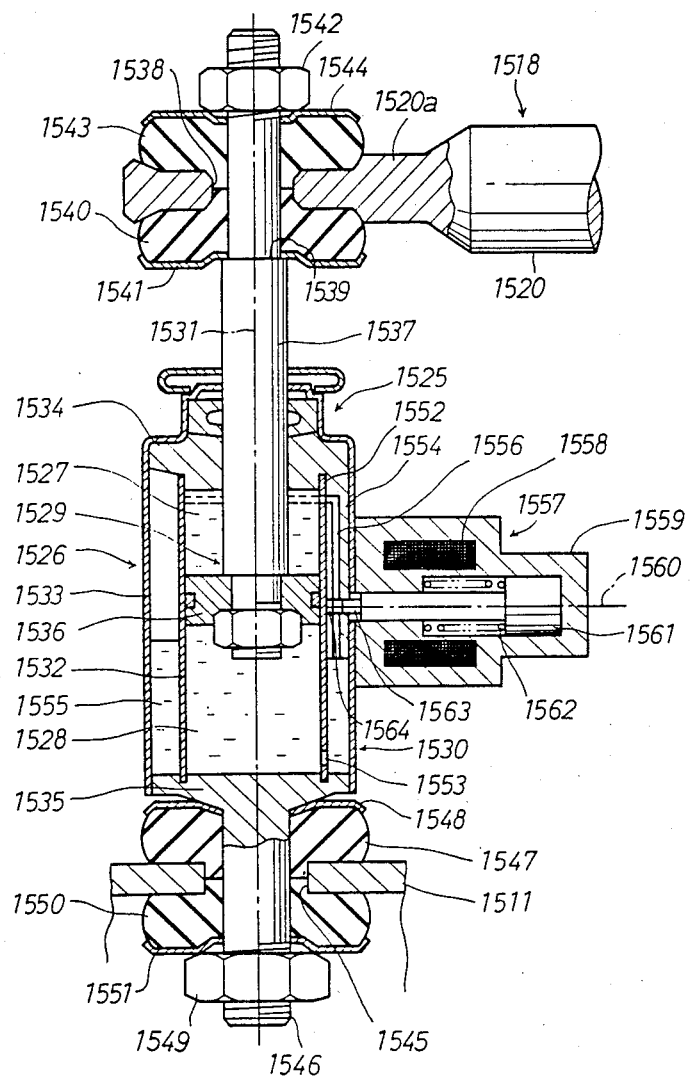
FIG. 20B is an enlarged sectional view of the coupling unit of FIG. 20A.

FIGS. 20A and 20B show a construction of a coupling unit for a stabilizer and a lower control arm, as the sixth example.

FIG. 20A shows a partial front view of a wishbone-type suspension including a coupling unit for a stabilizer of a vehicle. FIG. 20B shows an enlarged sectional view of the coupling unit shown in FIG. 20A. In the drawings, a wheel 1501 is rotatably supported by a knuckle 1503. The knuckle 1503 is pivotally coupled at the upper end to one end of an upper control arm 1507 by means of a pivot 1505, and is pivotally coupled at the lower end to one end of a lower control arm 1511 by means of a pivot 1509. The upper control arm 1507 and the lower control arm 1511 are pivotally coupled to a cross member 1517 of the vehicle by pivots 1513 and 1515. A stabilizer 1518, which is shaped as a U, is disposed along the width of the vehicle as shown in FIG. 20A. The stabilizer 1518 is coupled at its central rod 1519 to the body 1524 of the vehicle by brackets 1522 by means of rubber bushes (not shown in the drawing), so that the stabilizer can be rotated around its axis. The tip 1520a of an arm 1520 of the stabilizer 1518 is coupled to one portion near one end of the lower control arm 1511 by a coupling unit 1525. FIG. 20B shows the coupling unit 1525 including a piston-cylinder assembly 1526. The piston-cylinder assembly 1526 includes a piston 1529 and a cylinder 1530 which cooperate with each other to define two cylinder chambers 1527 and 1528. The cylinder 1530 includes an inner cylinder 1532 which supports the piston 1529 for movement back and forth along an axis 1531, an outer cylinder 1533 disposed concentrically to the inner cylinder 1532, and end caps 1534 and 1535 which close both the ends of the inner cylinder and the outer cylinder. The piston 1529 includes a main portion 1536 and a piston rod 1537, which bears the main portion 1536 at one end thereof and which extends along the axis 1531 through the end cap 1534 and the hole 1538 of the tip 1520a of the arm 1520 of the stabilizer 1518.

A rubber bush 1540 and a retainer 1541 for holding the bush are interposed between a shoulder 1539 of the piston rod 1537 and the tip 1520a. A rubber bush 1543 and a retainer 1544 are interposed between the tip 1520a and a nut 1542 screwed on the front end of the piston rod 1537. As a result, the piston rod 1537 is coupled to the tip 1520a of the arm 1520 of the stabilizer 1518 so that an impulsive force is damped. A rod 1546, which extends along the axis 1531 through a hole 1545 of the lower control arm 1511, is secured on the end cap 1535. A rubber bush 1547 and a retainer 1548 for holding the bush are interposed between the end cap 1535 and the lower control arm 1511. A rubber bush 1550 and a retainer 1551 for holding the bush are interposed between the lower control arm 1511 and a nut 1549 screwed on the front end of the rod 1546. As a result, the rod 1546 is coupled to the lower control arm 1511 so that an impulsive force is damped.

The inner cylinder 1532 is disposed with through holes 1552 and 1553 near the end caps 1534 and 1535. the end cap 1534 is integrally provided with a projection 1554 which extends along the axis 1531 between the inner cylinder 1532 and the outer cylinder 1533 and is located in tight contact with the inner and outer cylinders. The projection 1554 has an internal passage 1556 which is coincident at one end with the through hole 1552 and is open at the other end into an annular space 1555 between the inner cylinder 1532 and the outer cylinder 1533. As a result, the through hole 1552, the internal passage 1556, the annular space 1555 and the other through hole 1553 define a passage means for connecting both the cylinder chambers 1527 and 1528 to each other. A part of the annular space 1555 is filled with air. The cylinder chambers 1527 and 1528, the internal passage 1556 and the remaining part of the annular space 1555 are filled with oil. The change in the volume of the piston rod 1537 in the cylinder 1530, which is caused by the displacement of the piston 1529 from the cylinder 1530, is compensated by compression or expansion of the air filled in the part of the annular space 1555.

The connection of the internal passage 1556 is selectively controlled by a normally-opened solenoid valve 1557. The solenoid valve 1557 includes a core 1561, a compressed helical spring 1562 and a housing 1559 with a solenoid 1558. The housing 1559 is secured at one end on the outer cylinder 1533. The core 1561 is supported in the housing 1559 for movement back and forth along an axis 1560. The compressed helical spring 1562 presses the core 1561 rightward in FIG. 20B. A valve element 1563 is integrally formed as one piece at one end of the core 1561 to be selectively fitted into a hole 1564 extending to penetrate the internal passage 1556 of the projection 1554 in the horizontal direction.

When no electricity is applied to the solenoid 1558 according to an instruction from the ECU 4, the core 1561 is pressed rightward in the drawing by the compressed helical spring 1562 so as to open the valve 1557 to connect the internal passage 1556. On the contrary, when electricity is applied to the solenoid 1558 according to an instruction from the ECU 4, the core 1561 is driven leftward in the drawing against the force of the compressed helical spring 1562 so as to fit the valve element 1563 into the hole 1564 to isolate the internal passage 1556.

In the coupling unit constructed as above, when electricity is applied to the solenoid 1558 of the solenoid valve 1557, the solenoid valve 1557 is closed so as to disconnect the cylinder chambers 1527 and 1528 from each other. Thus, oil in one cylinder chamber is kept from flowing to the other cylinder chamber, so that the piston 1529 is hindered from moving relative to the cylinder 1530 along the axis 1531. As a result, the stabilizer 1518 works for suppressing the rolling of the vehicle so as to keep good control and high stability of the vehicle even when one of the wheels rides over a bump or through a dip in a road surface.

On the other hand, when no electricity is applied to the solenoid 1558, the solenoid valve 1557 is maintained in an open position shown in FIG. 20B, so that oil in both the cylinder chambers 1527 and 1528 can freely flow to each other via the internal passage 1556 and so forth. As a result, the piston 1529 can be smoothly moved in the cylinder 1530 so that the tips of both the right and left arms 1520 can be smoothly moved around the corresponding lower control arms 1511. Since the stabilizer does not work this time, the damping force for rear wheels of the vehicle is reduced to keep good riding comfort.

Although the invention has been described with reference to specific embodiments thereof, it will be apparent that numerous changes and modifications may be made therein without departing from the scope of the invention. It is, therefore, to be understood that it is not intended to limit the invention to the embodiment shown but only by the scope of the claims which follow.

What is claimed is:

1. A suspension controller for a vehicle comprising:

running condition detection means (M1) for detecting at least one of a vehicle height and a change in the vehicle operation;

control means (M3) comprising a plurality of control sections each having a proper predetermined condition, each control section comparing the detected result of said running condition detection means (M1) with the predetermined condition and, if the result satisfies the condition, outputting a proper command to alter a suspension characteristic;

preference means (M4) for selecting a preference command for altering the suspension characteristic to the hardest state among the proper commands outputted from the control sections of said control means (M3); and suspension characteristic alteration means (M2) for altering the suspension characteristic according to the preference command selected by said preference means (M4).

2. The suspension controller according to claim 1, wherein said control means (M3) comprises a shock control section, an attitude control section and a vibration control section.

3. The suspension controller according to claim 2, wherein:

the shock control section outputs a proper command for altering the suspension characteristic to a softer state when determining that a difference between the maximum value and the minimum value of a vehicle height detected as a road condition by said running condition detection means (M1) for a predetermined shock judgment time period is greater than or equal to a reference value;

the attitude control section outputs a proper command for altering the suspension characteristic to a harder state when, judging from the change in vehicle operation as detected by said running condition detection means (M1), determining that the vehicle attitude is about to abruptly change; and the vibration control section outputs a proper command for altering the suspension characteristic to a harder state but no harder than the harder state set by the attitude control section when determining that a difference between the maximum value and the minimum value of the vehicle height, as detected by said running condition detection means (M1) for a predetermined shock judgment time period, is greater than or equal to another reference value.

4. The suspension controller according to claim 3, wherein at least one of the predetermined conditions in the control sections of said control means (M3) varies in response to the vehicle speed.

5. The suspension controller according to claim 3, wherein the vehicle height value used for the determination in the shock control section or the vibration control section is a converted vehicle height, which is converted based on a conversion table from an actual vehicle height value detected by said running condition detection means (M1) and which converts the actual vehicle height value in unequal intervals in the upper and lower extremities thereof.

6. The suspension controller according to claim 2, wherein the attitude control section further comprises an anti-roll control part, an anti-squat control part, an anti-dive control part and an anti-shift-squat control part.

7. The suspension controller according to claim 6, wherein at least one of the predetermined conditions in the control sections of said control means (M3) varies in response to the vehicle speed.

8. The suspension controller according to claim 6, wherein the vehicle height value used for the determination in the shock control section or the vibration control section is a converted vehicle height, which is converted based on a conversion table from an actual vehicle height value detected by said running condition detection means (M1) and which converts the actual vehicle height value in unequal intervals in the upper and lower extremities thereof.

* * * * *